(12) United States Patent
Inoue

(10) Patent No.: US 10,887,480 B2
(45) Date of Patent: Jan. 5, 2021

(54) ELECTRONIC DEVICE, INFORMATION PROCESSING SYSTEM, AND TERMINATION OPERATION PREVENTING METHOD

(71) Applicant: Hiroyuki Inoue, Kanagawa (JP)

(72) Inventor: Hiroyuki Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/580,369

(22) Filed: Sep. 24, 2019

(65) Prior Publication Data
US 2020/0106899 A1 Apr. 2, 2020

(30) Foreign Application Priority Data

Sep. 28, 2018 (JP) .................................. 2018-185998

(51) Int. Cl.
| | | |
|---|---|---|
| *G06F 21/50* | (2013.01) | |
| *G06F 21/52* | (2013.01) | |
| *G06F 21/62* | (2013.01) | |
| *H04N 1/00* | (2006.01) | |
| *G06F 3/12* | (2006.01) | |

(52) U.S. Cl.
CPC ....... *H04N 1/00464* (2013.01); *G06F 3/1205* (2013.01); *G06F 3/1268* (2013.01); *H04N 1/00477* (2013.01); *H04N 1/00482* (2013.01)

(58) Field of Classification Search
USPC ........... 358/1.1–3.29, 1.11–1.18; 710/28–59; 715/705–718, 736–741; 726/1–34
See application file for complete search history.

(56) References Cited

U.S. PATENT DOCUMENTS

| | | | |
|---|---|---|---|
| 9,019,528 B2 | 4/2015 | Mihara et al. | |
| 10,162,958 B2 | 12/2018 | Inoue | |
| 10,305,961 B2 | 5/2019 | Yasuhara | |
| 10,326,897 B2 | 6/2019 | Inoue | |
| 2011/0261398 A1* | 10/2011 | Mihara | H04N 1/00464 358/1.15 |
| 2014/0009780 A1* | 1/2014 | Hamachi | G06F 3/1221 358/1.14 |
| 2017/0171409 A1 | 6/2017 | Kawaura | |
| 2019/0095151 A1 | 3/2019 | Inoue | |
| 2020/0162676 A1* | 5/2020 | Miyajima | G03B 17/18 |

FOREIGN PATENT DOCUMENTS

| | | | | |
|---|---|---|---|---|
| JP | 11215460 | * | 8/1999 | .......... H04N 5/7826 |
| JP | 5591040 | | 9/2014 | |
| JP | 2016-081345 | | 5/2016 | |
| JP | 2017-105057 | | 6/2017 | |

* cited by examiner

*Primary Examiner* — Marcellus J Augustin
(74) *Attorney, Agent, or Firm* — IPUSA, PLLC

(57) ABSTRACT

An electronic device includes processing circuitry; and a memory storing computer-executable instructions that cause the processing circuitry to instruct, by a web application operating in a web browser, a job executor to start executing a job by using a library; send a report of an execution state of the job executed by the job executor; and prevent a termination operation of terminating the web application that is displayed in the web browser, until the job instructed to start is terminated.

12 Claims, 19 Drawing Sheets

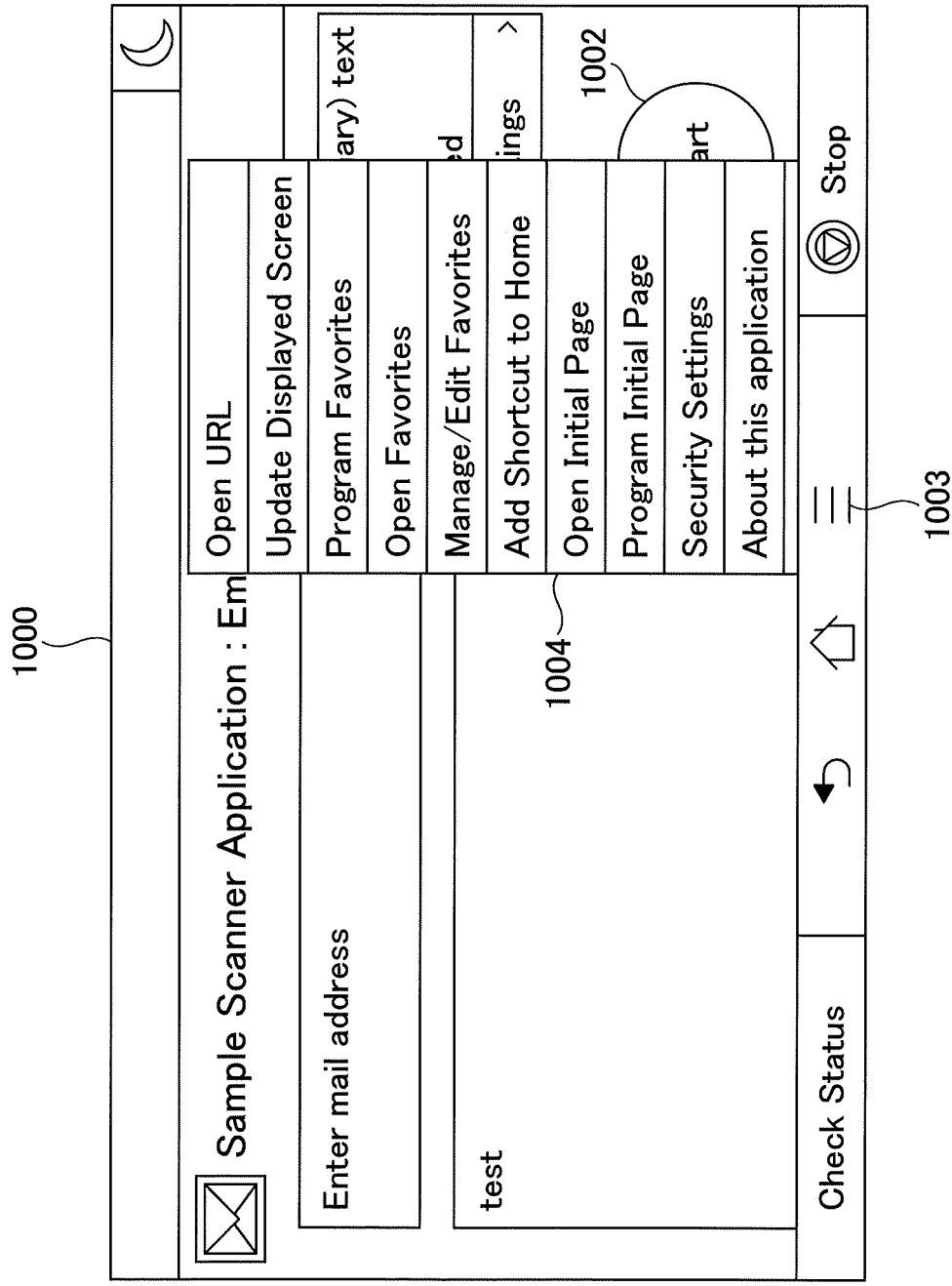

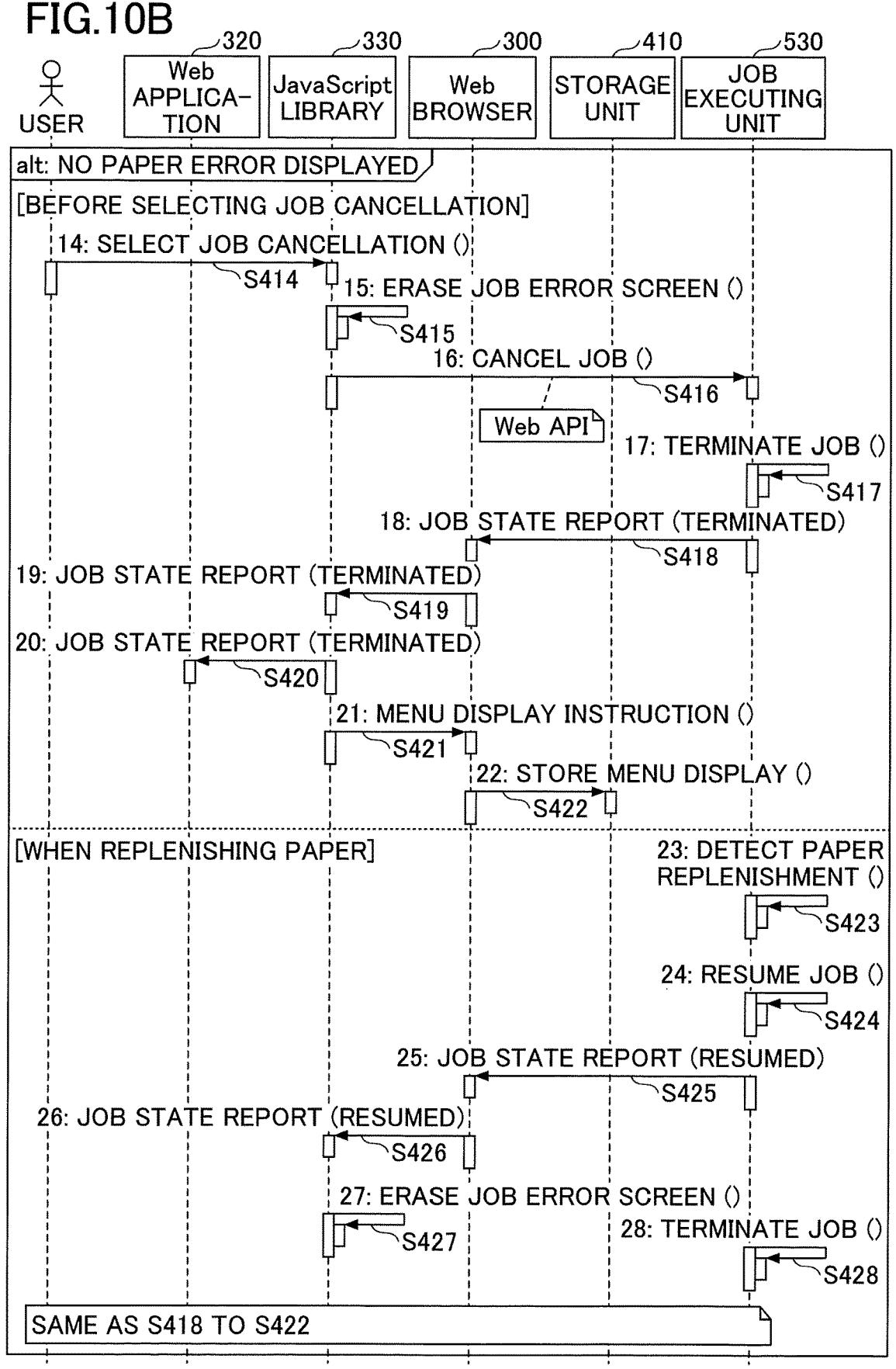

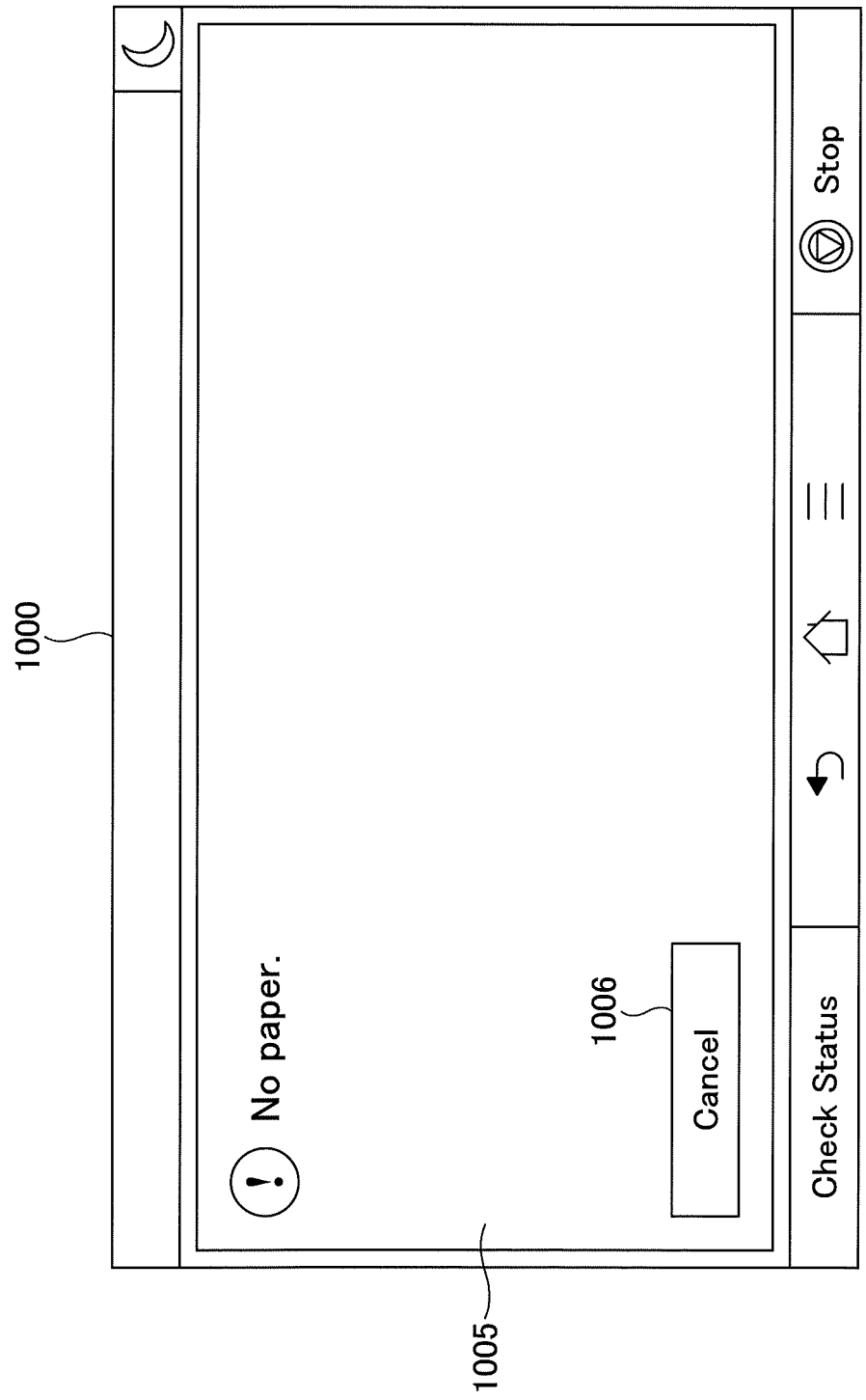

US 10,887,480 B2

ELECTRONIC DEVICE, INFORMATION PROCESSING SYSTEM, AND TERMINATION OPERATION PREVENTING METHOD

CROSS-REFERENCE TO RELATED APPLICATION

The present application is based on and claims priority under 35 U.S.C. § 119 to Japanese Patent Application No. 2018-185998, filed on Sep. 28, 2018, the contents of which are incorporated herein by reference in their entirety.

BACKGROUND OF THE INVENTION

1. Field of the Invention

The present invention relates to an electronic device, an information processing system, and a termination operation preventing method.

2. Description of the Related Art

In recent years, there have been multifunction peripherals (MFPs) including scanner and printer functions, etc., equipped with a web browser. In some multifunction peripherals equipped with a web browser, the functions of the multifunction peripheral are used from web applications operating on the web browser.

For example, in the related art, there has been known an information processing apparatus that restricts access to functions provided by an MFP. Specifically, the information processing apparatus restricts not only to functions implemented in the MFP, but also to functions implemented by a web application, according to the user's authority. When it is determined that execution of a web application by the user is allowed, the information processing apparatus displays, on a display unit, a screen for instructing execution of the web application (see, for example, Patent Document 1).

Patent Document 1: Japanese Unexamined Patent Application Publication No. 2016-81345

SUMMARY OF THE INVENTION

According to one aspect of the present invention, there is provided an electronic device including processing circuitry; and a memory storing computer-executable instructions that cause the processing circuitry to instruct, by a web application operating in a web browser, a job executor to start executing a job by using a library; send a report of an execution state of the job executed by the job executor; and prevent a termination operation of terminating the web application that is displayed in the web browser, until the job instructed to start is terminated.

BRIEF DESCRIPTION OF THE DRAWINGS

FIG. 9 is an example of a web application screen in which a menu is displayed according to the first embodiment of the present invention;

FIG. 10B is an example of a sequence diagram (2/2) illustrating a processing procedure of the information processing system according to the first embodiment of the present invention;

FIG. 11 is an image diagram illustrating an example of a web application screen in which a job error screen is displayed according to the first embodiment of the present invention;

DETAILED DESCRIPTION OF THE PREFERRED EMBODIMENTS

In the related art, there has been a problem that when the web application executes a job by using a function included in the multifunction peripheral, if the web application is terminated while the job is being executed, the currently executed job cannot be continued.

A problem to be addressed by an embodiment of the present invention is to provide an electronic device that prevents the operation of terminating a web application until the job executed by the web application is terminated.

Embodiments of the present invention will be described by referring to the accompanying drawings.

First Embodiment

Example of Overall Configuration According to First Embodiment

Figure 1:
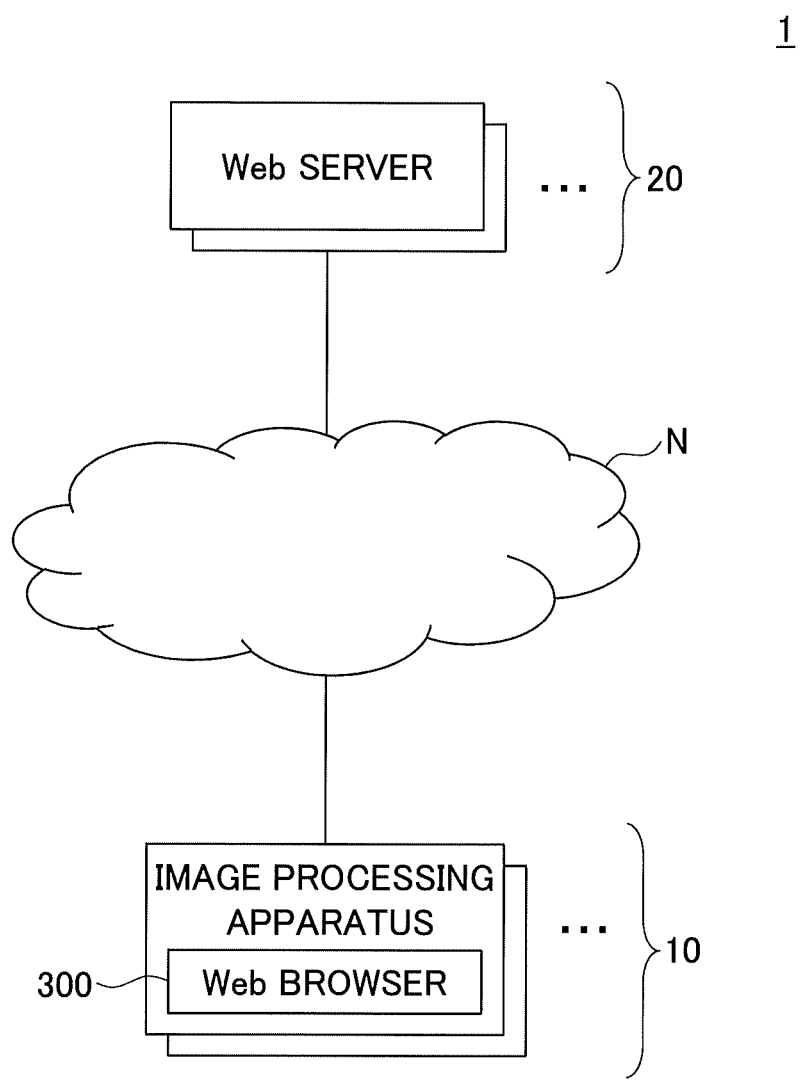
FIG. 1 is a configuration diagram illustrating an example of an information processing system according to a first embodiment of the present invention.

First, the entire configuration of an information processing system 1 according to the present embodiment will be described with reference to FIG. 1. FIG. 1 is a configuration diagram illustrating an example of an information processing system according to the present embodiment.

As illustrated in FIG. 1, the information processing system 1 according to the present embodiment includes one or more image processing apparatuses 10 and one or more web servers 20, which are communicatively connected via a network N, such as the Internet.

The image processing apparatus 10 is an example of an electronic device in which a web browser 300 is installed. The user of the image processing apparatus 10 may use the web browser 300 to use a web application provided by the web server 20. By using the web application, for example, the user of the image processing apparatus 10 can print an electronic file downloaded from a predetermined server or the like, or transmit an e-mail, to which image data generated by scanning is attached, to a specified destination.

The web server 20 is a computer or a computer system that provides a web application via the network N. The web application provided by the web server 20 may be developed and provided by a company (manufacturer vendor) that manufactures the image processing apparatus 10, or may be developed and provided by a third-party vendor that is different from the manufacturer vendor.

The web application is implemented by interpreting and executing web content provided by the web server 20, in the web browser 300 installed in the image processing apparatus 10. The web content includes, for example, HyperText Markup Language (HTML), JavaScript (registered trademark), Cascading Style Sheets (CSS), and various image files, etc.

In addition to the above-described configuration, the web application may have a system configuration such that the web application per se is not sent to the image processing apparatus 10, but the web application is operated in the web server 20, and only the execution instruction information (for example, information for calling the Application Programming Interface (API) using various functions of the image processing apparatus 10) for executing an image forming job is sent from the web server 20 to the image processing apparatus 10.

As described above, the web application provided by the web server 20 can provide a web service using various functions of the image processing apparatus 10. Examples of various functions of the image processing apparatus 10 include various image processing functions such as a scanning function, a printing function, a copy function, and a fax function, an authentication function, an address book function, and a mail transmission function.

The configuration of the information processing system 1 illustrated in FIG. 1 is an example. For example, the image processing apparatus 10 is an example of an electronic device and may be a projector, an electronic blackboard, a digital signage, a head-up display, an industrial machine, a manufacturing device, an imaging device, a sound collector, a medical device, a network appliance, and the like. An electronic blackboard is an electronic device with an electronic board function capable of mutual communication. A digital signage is an example of an electronic device having an output function.

The electronic device may also be a personal computer, a mobile phone, a smartphone, a tablet terminal, a game machine, a Personal Digital Assistant (PDA), a digital camera, a wearable terminal, and the like. That is, the electronic device may be any kind of electronic device in which the web browser 300 is installed.

Example of Hardware Configuration According to First Embodiment

Figure 2:
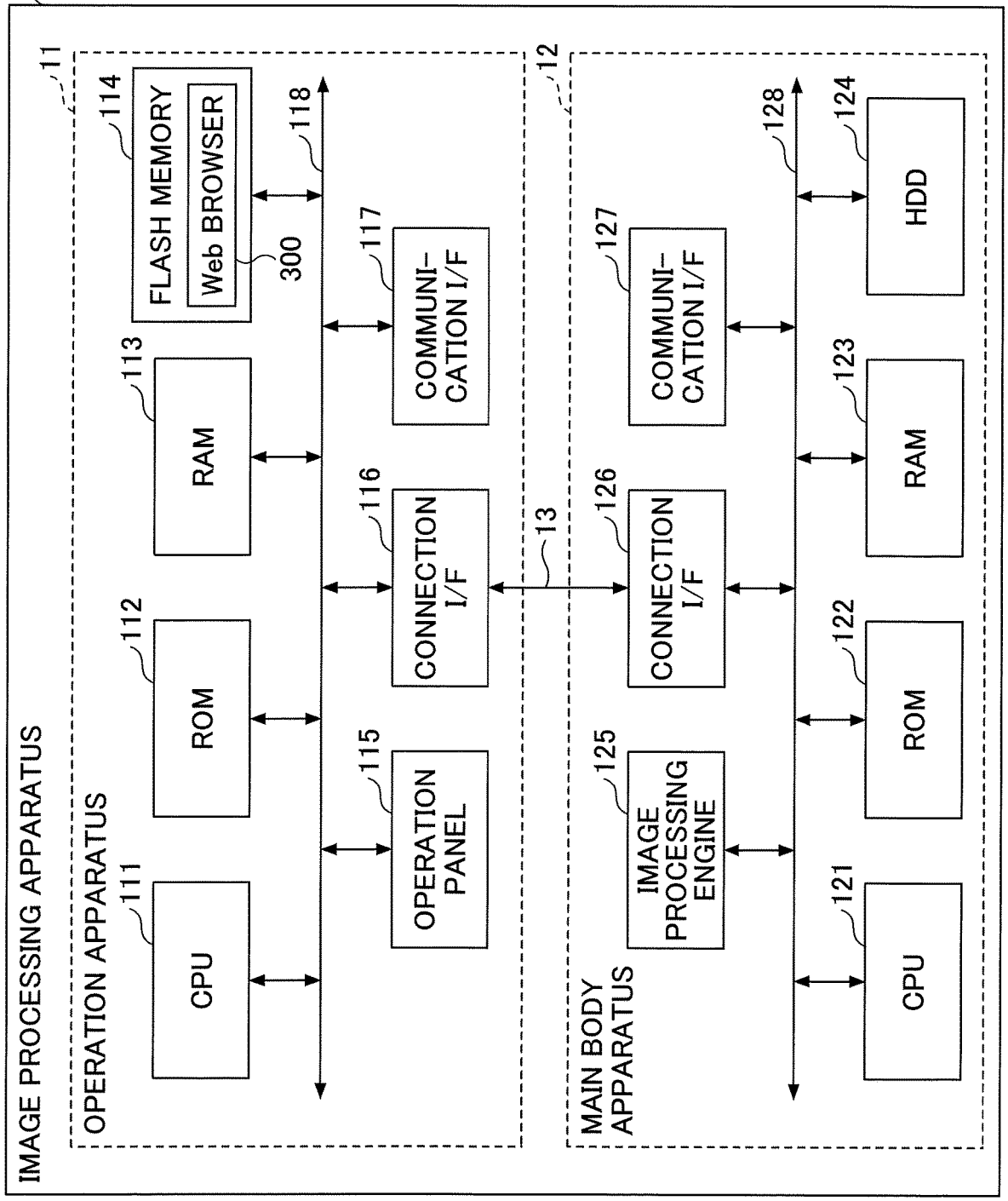
FIG. 2 is an example of a hardware configuration diagram of an image processing apparatus according to the first embodiment of the present invention.

Next, the hardware configuration of the image processing apparatus 10 according to the present embodiment will be described with reference to FIG. 2. FIG. 2 is an example of a hardware configuration diagram of an image processing apparatus according to the present embodiment. As illustrated in FIG. 2, the image processing apparatus 10 according to the present embodiment includes an operation apparatus 11 and a main body apparatus 12.

The operation apparatus 11 is used when a user performs various operations such as selecting an image processing function to be executed by the main body apparatus 12, inputting various setting values (parameters) to execute the image processing function, inputting an instruction to start execution of the image processing function, and switching the display screen, etc. The main body apparatus 12 executes various processes such as executing an image processing function in accordance with various operations by a user in the operation apparatus 11.

As illustrated in FIG. 2, the operation apparatus 11 of the image processing apparatus 10 includes a central processing unit (CPU) 111, a read-only memory (ROM) 112, and a random access memory (RAM) 113. Further, the operation apparatus 11 includes a flash memory 114, an operation panel 115, a connection interface (I/F) 116, and a communication I/F 117. These hardware elements are interconnected via a bus 118.

The CPU 111 is an arithmetic device that controls the entire operation apparatus 11 by executing various programs stored in the ROM 112 or the flash memory 114, by using the RAM 113 as the work area. The ROM 112 is a non-volatile semiconductor memory (storage device) that can hold data even when the power is turned off. The RAM 113 is a volatile semiconductor memory (storage device) that temporarily holds programs and data.

The flash memory 114 is a non-volatile storage device and stores various programs (for example, the web browser 300 or the like) executed by the CPU 111 and various kinds of data. The operation panel 115 is used by the user to perform various operations. The operation panel 115 displays various screens or the like to the user.

The connection I/F 116 is an interface for communicating with the main body apparatus 12 via a communication path 13. For example, an interface of the Universal Serial Bus (USB) standard is used as the connection I/F 116.

The communication I/F 117 is an interface for communicating with other devices. For example, a wireless Local Area Network (LAN) of the Wi-Fi standard is used as the communication I/F 117.

Similarly, the main body apparatus 12 of the image processing apparatus 10 includes a CPU 121, a ROM 122, and a RAM 123. Further, the main body apparatus 12 includes a hard disk drive (HDD) 124, an image processing engine 125, a connection I/F 126, and a communication I/F 127. These hardware elements are interconnected via a bus 128.

The CPU 121 is an arithmetic device that controls the entire main body apparatus 12 by executing various programs stored in the ROM 122 or the HDD 124, by using the RAM 123 as a work area. The ROM 122 is a non-volatile semiconductor memory (storage device) that can hold data even when the power is turned off. The RAM 123 is a volatile semiconductor memory (storage device) that temporarily holds programs and data. The HDD 124 is a non-volatile storage device and stores various programs (for example, programs for implementing the present embodiment) executed by the CPU 121 and various kinds of data.

The image processing engine 125 is a hardware element that performs image processing for implementing various image processing functions such as a printing function, a scanning function, a copy function, and a fax function. The image processing engine 125 includes, for example, a plotter for printing images onto a sheet of paper or the like, a scanner for optically reading an original document to generate image data, and a fax communication device for performing fax communication. The image processing engine 125 may include, for example, a finisher for sorting the printed sheet materials or an automatic document feeder (ADF) for automatically feeding an original document.

The connection I/F 126 is an interface for communicating with the operation apparatus 11 via the communication path 13. For example, an interface of the USB standard is used as the connection I/F 126. The communication I/F 127 is an interface for communicating with other devices. For example, a wireless Local Area Network (LAN) of the Wi-Fi standard is used as the communication I/F 127.

The image processing apparatus 10 according to the present embodiment has the hardware configuration illustrated in FIG. 2, and, therefore, the image processing apparatus 10 is capable of implementing various processes described later. In FIG. 2, the configuration in which the image processing apparatus 10 includes the operation apparatus 11 is illustrated as an example, but the present invention is not limited thereto. For example, an information processing terminal such as a tablet terminal, a smartphone, a mobile phone, a PDA, or the like may function as the operation apparatus of the image processing apparatus 10.

That is, the information processing terminal may be able to control the image processing apparatus 10 by communicating with the image processing apparatus 10 via the communication I/F 117 of the operation apparatus 11 or the communication I/F 127 of the main body apparatus 12. The hardware configuration of the web server 20 will not be described, but the web server 20 is implemented by a general computer system.

Figure 3:
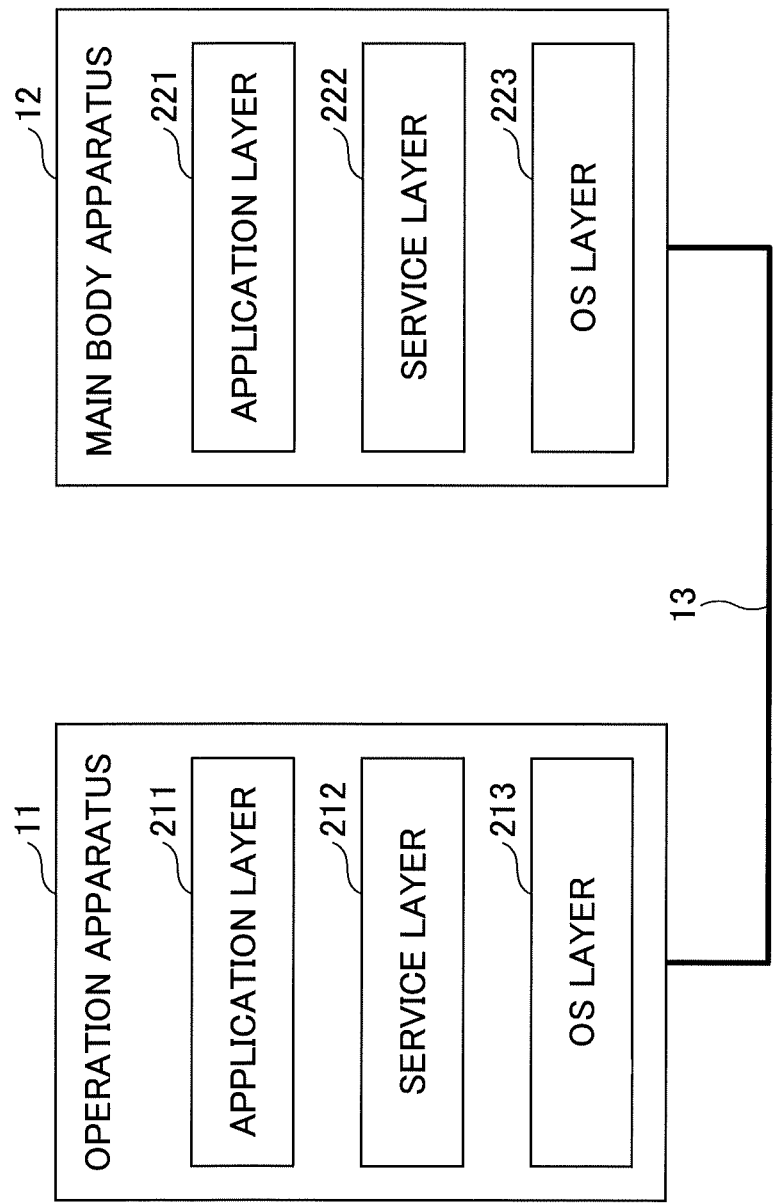
FIG. 3 is a diagram illustrating an example of a hierarchical structure of software groups included in an operation apparatus and a main body apparatus of the image processing apparatus according to the first embodiment of the present invention.

Hierarchical Structure of Software Groups of Image Processing Apparatus 10 According to First Embodiment Next, a hierarchical structure of the software groups included in the operation apparatus 11 and the main body apparatus 12 of the image processing apparatus 10 according to the present embodiment will be described with reference to FIG. 3. FIG. 3 is a diagram illustrating an example of a hierarchical structure of software groups included in the operation apparatus 11 and the main body apparatus 12 of the image processing apparatus 10 according to the present embodiment. FIG. 3 illustrates a hierarchical structure of software groups included in the operation apparatus 11 and a hierarchical structure of software groups included in the main body apparatus 12.

First, the hierarchical structure of the software groups included in the main body apparatus (i.e., program groups stored in the ROM 122 or the HDD 124 of the main body apparatus 12) will be described. The software groups included in the main body apparatus 12 of FIG. 3 can be broadly classified into an application layer 221, a service layer 222, and an operating system (OS) layer 223.

The software classified into the application layer 221 is software for operating the hardware resources to implement image processing functions. Specifically, the software classified into the application layer 221 includes a print application, a scan application, a copy application, and a fax application.

The software classified into the service layer 222 is the software interposed between the application layer 221 and the OS layer 223. This software serves as an interface through which the hardware resources provided in the main body apparatus 12 are used by the software of the application layer 221, and an interface through which the state of the hardware resources provided in the main body apparatus 12 is reported.

Specifically, the service layer 222 accepts an execution request (instruction to start a job to a job executing unit) with respect to the hardware resources, or arbitrates the accepted execution request. The execution request accepted by the service layer 222 includes an execution request for image processing by the image processing engine 125 (such as a scan execution request for scanning by a scanner or a print execution request for printing by a plotter).

The role of the software classified into the service layer 222 as the above-described interface is the same with respect to an application layer 211 of the operation apparatus 11. That is, by accessing the service layer 222, the software classified into the application layer 211 of the operation apparatus 11 can operate the hardware resources of the main body apparatus 12 to implement the image processing functions.

The software classified into the OS layer 223 is a program referred to as the basic software (OS: operating system) and provides a basic function for controlling the hardware resources of the main body apparatus 12. The software classified into the OS layer 223 accepts execution requests for the hardware resources from the software classified into the application layer 221 via the software classified into the service layer 222 and executes processing according to the execution request.

Next, the hierarchical structure of the software groups (i.e., the program groups stored in the ROM 112 or the flash memory 114 of the operation apparatus 11) included in the operation apparatus 11 will be described. Similar to the main body apparatus 12, the software groups included in the operation apparatus 11 can be broadly classified into the application layer 211, a service layer 212, and an OS layer 213.

However, the functions provided by the software classified into the application layer 211 and the types of execution requests that the service layer 212 can accept are different from those of the main body apparatus 12. The software classified into the application layer 211 of the operation apparatus 11 primarily provides a user interface function for performing various operations and displaying information. The web browser 300 is also software classified into the application layer 211.

In the present embodiment, the OS of the operation apparatus 11 and the OS of the main body apparatus 12 operate independently from each other. Further, if the operation apparatus 11 and the main body apparatus 12 are capable of communicating with each other, the OS of the operation apparatus 11 and the OS of the main body apparatus 12 need not be the same type. For example, Android (registered trademark) may be used as the OS of the operation apparatus 11, while Linux (registered trademark) may be used as the OS of the main body apparatus 12.

As described above, in the image processing apparatus 10 according to the present embodiment, the operation apparatus 11 and the main body apparatus 12 are controlled by different OS's. For this reason, communication between the operation apparatus 11 and the main body apparatus 12 is not performed as communication between processes within a single apparatus, but is performed as communication between different information processing apparatuses.

However, the image processing apparatus 10 according to the present embodiment is not limited to the case in which different types of OS's are operating in the operation apparatus 11 and the main body apparatus 12, and the same type of OS may be operating in the operation apparatus 11 and the main body apparatus 12. The image processing apparatus 10 according to the present embodiment is not limited to the case where the OS of the operation apparatus 11 and the OS of the main body apparatus 12 are operating independently from each other. A single OS may be operating on the operation apparatus 11 and the main body apparatus 12.

Example of Software Configuration According to First Embodiment

Figure 4:
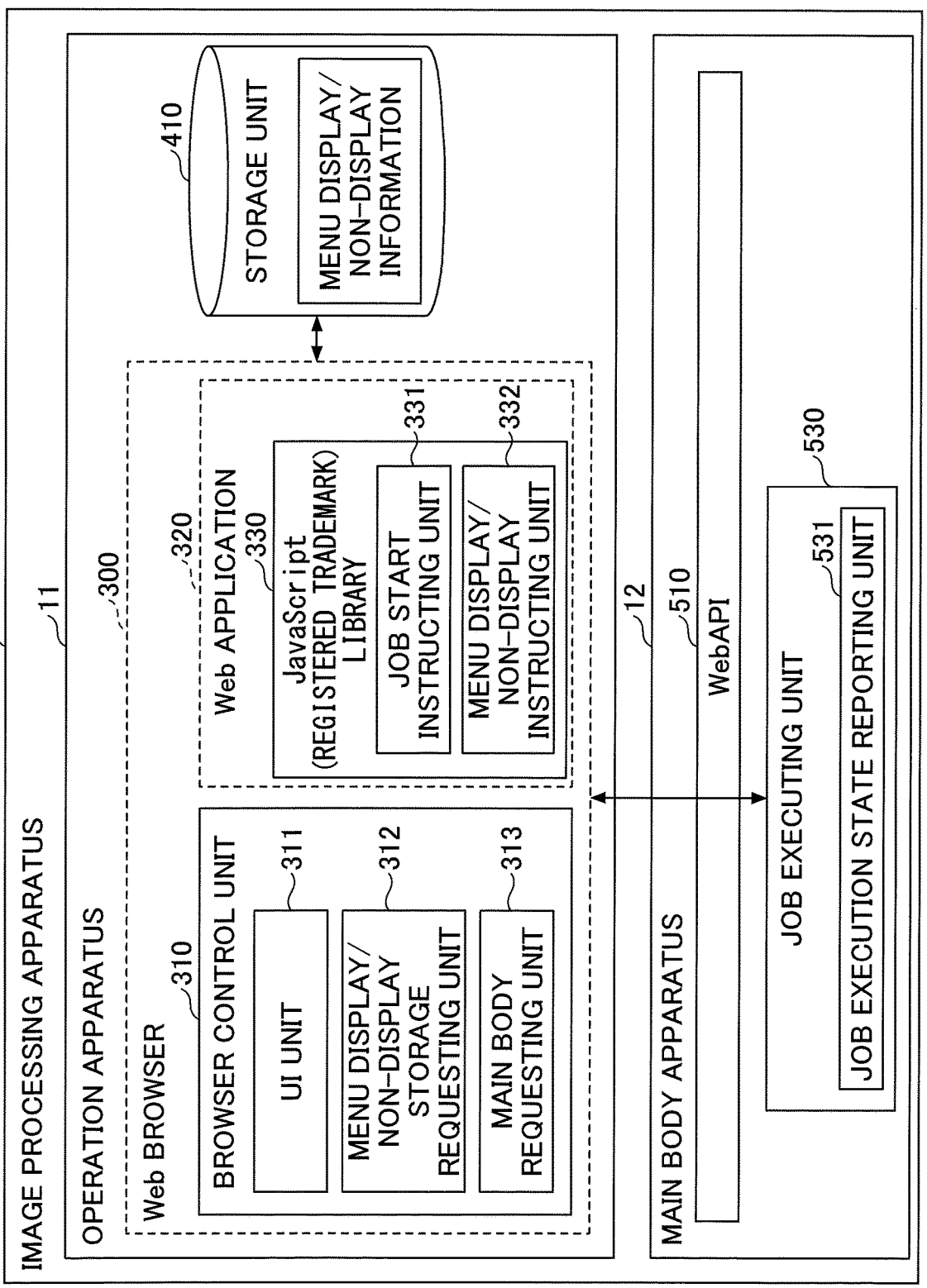
FIG. 4 is a software configuration diagram illustrating an example of the image processing apparatus according to the first embodiment of the present invention.

Next, the software configuration of the image processing apparatus 10 according to the present embodiment will be described with reference to FIG. 4. FIG. 4 is a software configuration diagram illustrating an example of the image processing apparatus according to the present embodiment.

As illustrated in FIG. 4, the operation apparatus 11 of the image processing apparatus 10 according to the present embodiment includes a browser control unit 310 and a web application 320. Each of these units is implemented by a process that the web browser 300 causes the CPU 111 to execute. The web application 320 is implemented by executing a web content (e.g., JavaScript), provided by the web server 20, on the web browser 300. The operation apparatus 11 includes a storage unit 410. The storage unit 410 may be implemented by using, for example, the flash memory 114 or the RAM 113.

The main body apparatus 12 of the image processing apparatus 10 according to the present embodiment includes a Web API 510, a job execution state reporting unit 531, and a job executing unit 530. Each of these units is implemented by a process that one or more programs installed in the main body apparatus 12 causes the CPU 121 to execute.

The web application 320 is implemented by a web content provided by the web server 20 being operated on the web browser 300. The web application 320 includes a JavaScript library 330.

The JavaScript library 330 is an API collection using various functions of the image processing apparatus 10. The JavaScript library 330 is developed and provided, for example, by the manufacturer vendor. The web application 320 uses various functions of the image processing apparatus 10 by using the JavaScript library 330.

The JavaScript library 330 includes a job start instructing unit 331 and a menu display/non-display instructing unit 332. The job start instructing unit 331 instructs the main body apparatus 12 to start a job by using the Web API 510. The menu display/non-display instructing unit 332 instructs the storage unit 410 to store the menu display/non-display information of the web application 320.

The browser control unit 310 performs various processes for implementing various functions provided by the web browser, such as interpretation and display of web content. The browser control unit 310 includes a user interface (UI) unit 311, a menu display/non-display storage requesting unit 312, and a main body requesting unit 313.

The UI unit 311 displays a web page corresponding to the web content. The UI unit 311 accepts various operations (for example, pressing a button) by a user with respect to a web page. The menu display/non-display storage requesting unit 312 stores the menu display/non-display information of the web application 320 into the storage unit 410. The main body requesting unit 313 makes various requests to the main body apparatus 12 via the Web API 510 of the main body apparatus 12.

The Web API 510 is an API for the operation apparatus 11 to make various requests to the main body apparatus 12. An instruction to start a job to the job executing unit 530 and a request to execute a function to the job executing unit 530 are given via the Web API 510.

The job executing unit 530 accepts an instruction to start a job using various functions and executes the job. The job execution state reporting unit 531 reports, to the operation apparatus 11, the job execution state of the job executed by the job executing unit 530. The job execution state reported by the job execution state reporting unit 531 may include started, terminated, and error has occurred, etc.

Details of Processing According to First Embodiment

Figure 5:
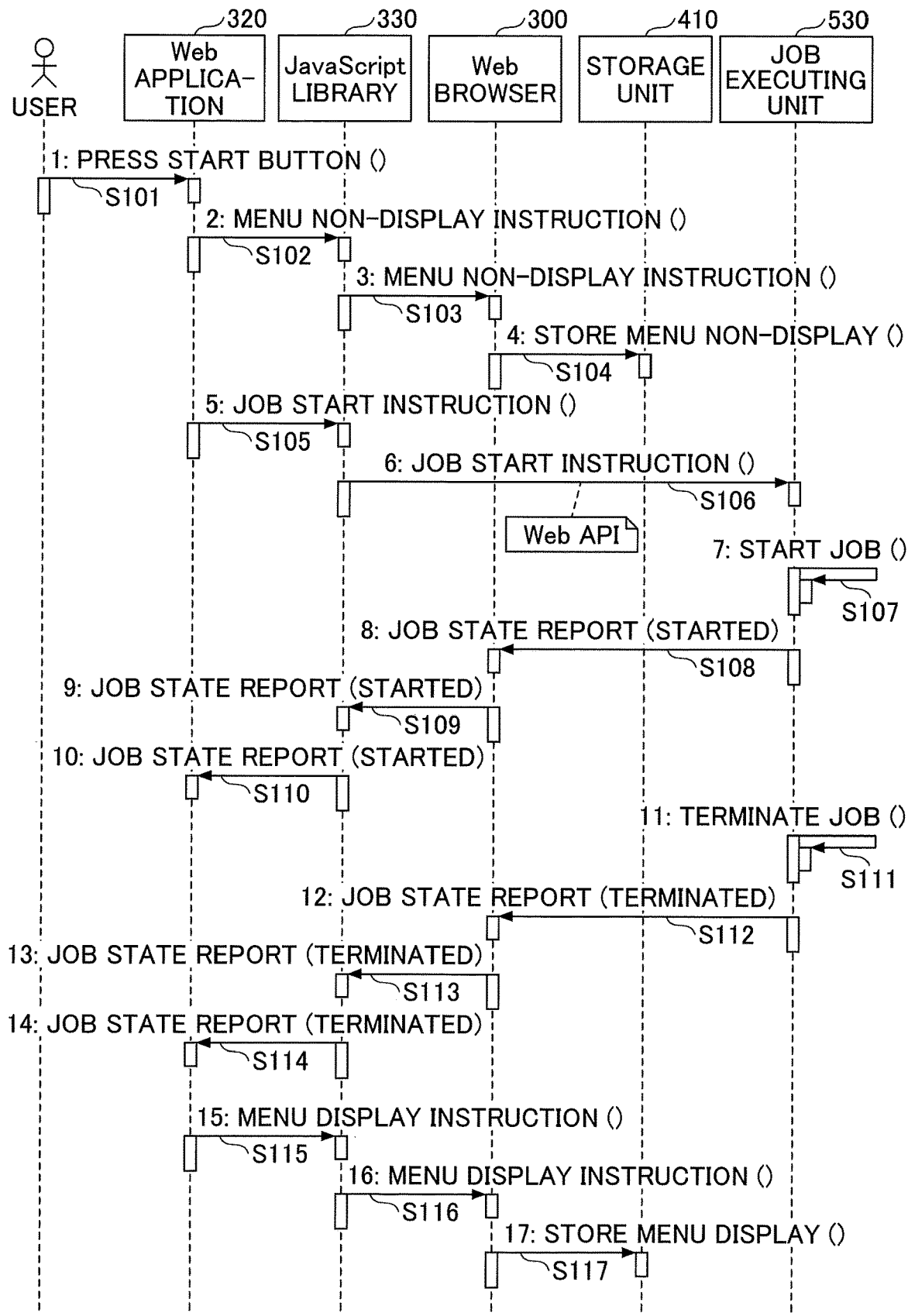
FIG. 5 is a sequence diagram illustrating a processing procedure of the information processing system according to the first embodiment of the present invention.

Next, the processing of the information processing system 1 according to the present embodiment will be described in detail. For example, the image processing apparatus 10 according to the present embodiment prevents the web application 320 from being terminated during the execution of a job for which the web application 320 instructed the start by the processing illustrated in FIG. 5. FIG. 5 is a sequence diagram illustrating a processing procedure of the information processing system according to the present embodiment.

It is assumed that the web application 320 is implemented by executing web content, provided by the web server 20, on the web browser 300. For example, a shortcut icon representing a Uniform Resource Locator (URL) of the web content provided by the web server 20 is pressed by the user, and the web content is acquired (downloaded) from the web server 20 by the web browser 300. The user may directly specify the URL of the web content in an address bar of the web browser 300 or the like.

Figure 6:
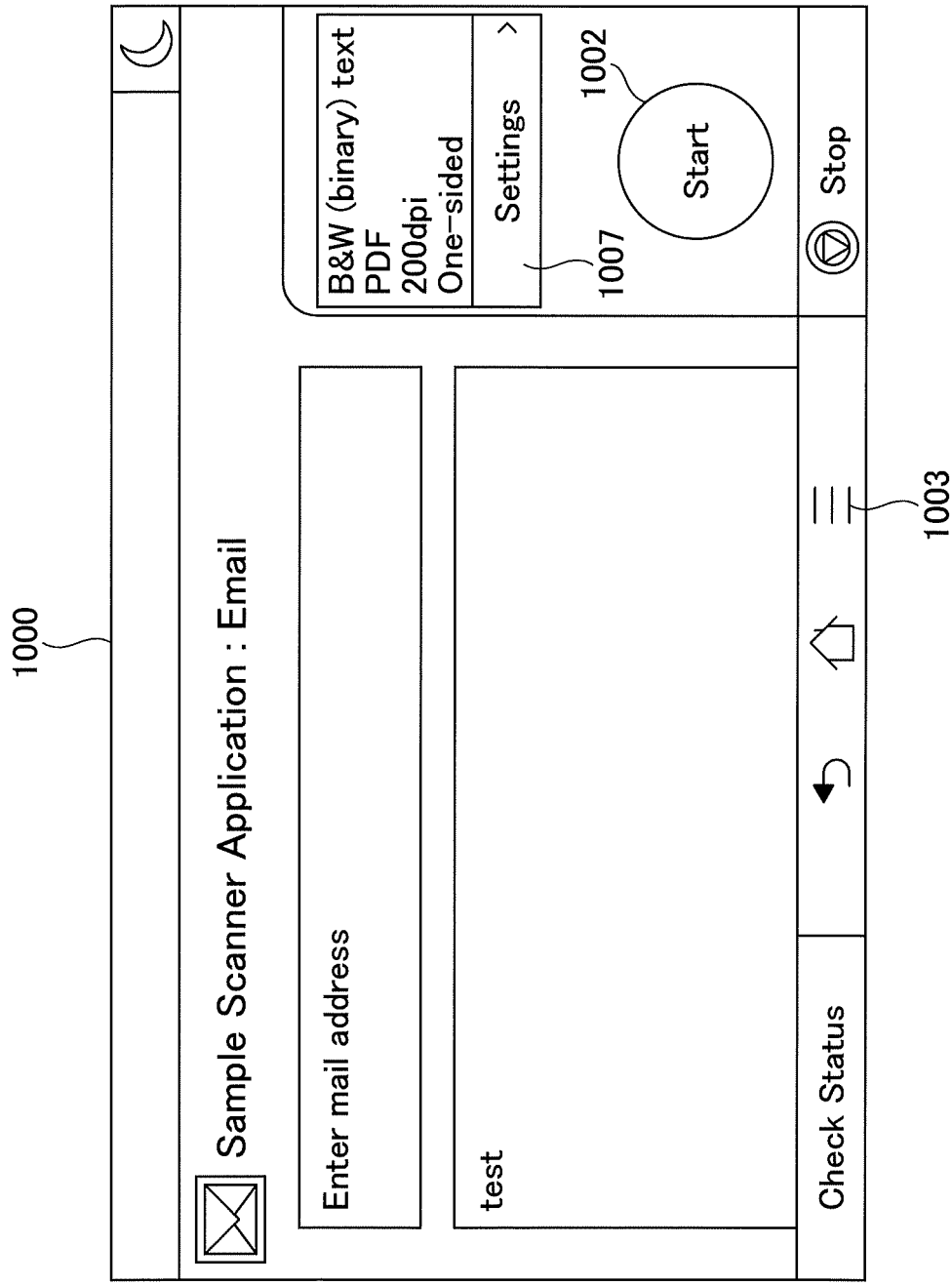
FIG. 6 is an image diagram illustrating an example of a web application screen according to the first embodiment of the present invention.

When the web content is executed on the web browser 300, the operation panel 115 of the operation apparatus 11 displays a web application screen 1000, for example, as illustrated in FIG. 6. The user can instruct the web application 320 to start the job by pressing a start button 1002 of the web application screen 1000.

In step S101, the user presses the start button 1002 of the web application screen 1000. The web application 320, which receives the report of the pressing of the start button 1002 from the UI unit 311 of the browser control unit 310, gives an instruction to hide the menu (non-display) to the JavaScript library 330 in step S102. Specifically, this is an operation in which JavaScript described in the web content for implementing the web application 320 calls the API of the menu non-display instruction of the JavaScript library 330. The menu display/non-display instructing unit 332 of the JavaScript library 330 proceeds to step S103 and gives a menu non-display instruction to the web browser 300.

Proceeding to step S104, the web browser 300 stores the menu non-display information in the storage unit 410. While the menu non-display information is stored in the storage unit 410, the termination operation of the web application 320 is prevented, as will be described later.

Proceeding to step S105, the web application 320 instructs the JavaScript library 330 to start a job. In step S106, the job start instructing unit 331 of the JavaScript library 330 instructs the job executing unit 530 to start the job using the Web API 510. Proceeding to step S107, the job executing unit 530 starts the execution of the job.

In step S108, the job execution state reporting unit 531 of the main body apparatus 12 reports, to the web browser 300, "started" as the job execution state. The job execution state "started" is reported to the web application 320 in steps S109 to S110.

In step S111, the job executing unit 530 terminates the execution of the job. In step S112, the job execution state reporting unit 531 of the main body apparatus 12 reports, to the web browser 300, "terminated" as the job execution state. The job execution state "terminated" is reported to the web application 320 in steps S113 to S114.

The web application 320, which has received the report of the job execution state "terminated", instructs the JavaScript library 330 to display the menu in step S115. The menu display/non-display instructing unit 332 of the JavaScript library 330 proceeds to step S116 and gives a menu display instruction to the web browser 300.

Proceeding to step S117, the web browser 300 stores the menu display information in the storage unit 410. While the menu display information is stored in the storage unit 410, the termination operation of the web application 320 is not prevented, as will be described later. Further, according to the processing of the sequence diagram of FIG. 5, the web application 320 can determine the timing when to start/end the prevention of the termination operation of the web application 320.

That is, the prevention of the termination operation of the web application 320 can be started/ended at a timing desired by a third-party vendor. For example, a third-party vendor can flexibly start/end the prevention of the termination operation of the web application 320 not only at the timing of executing the job but at other timings also.

Figure 7:
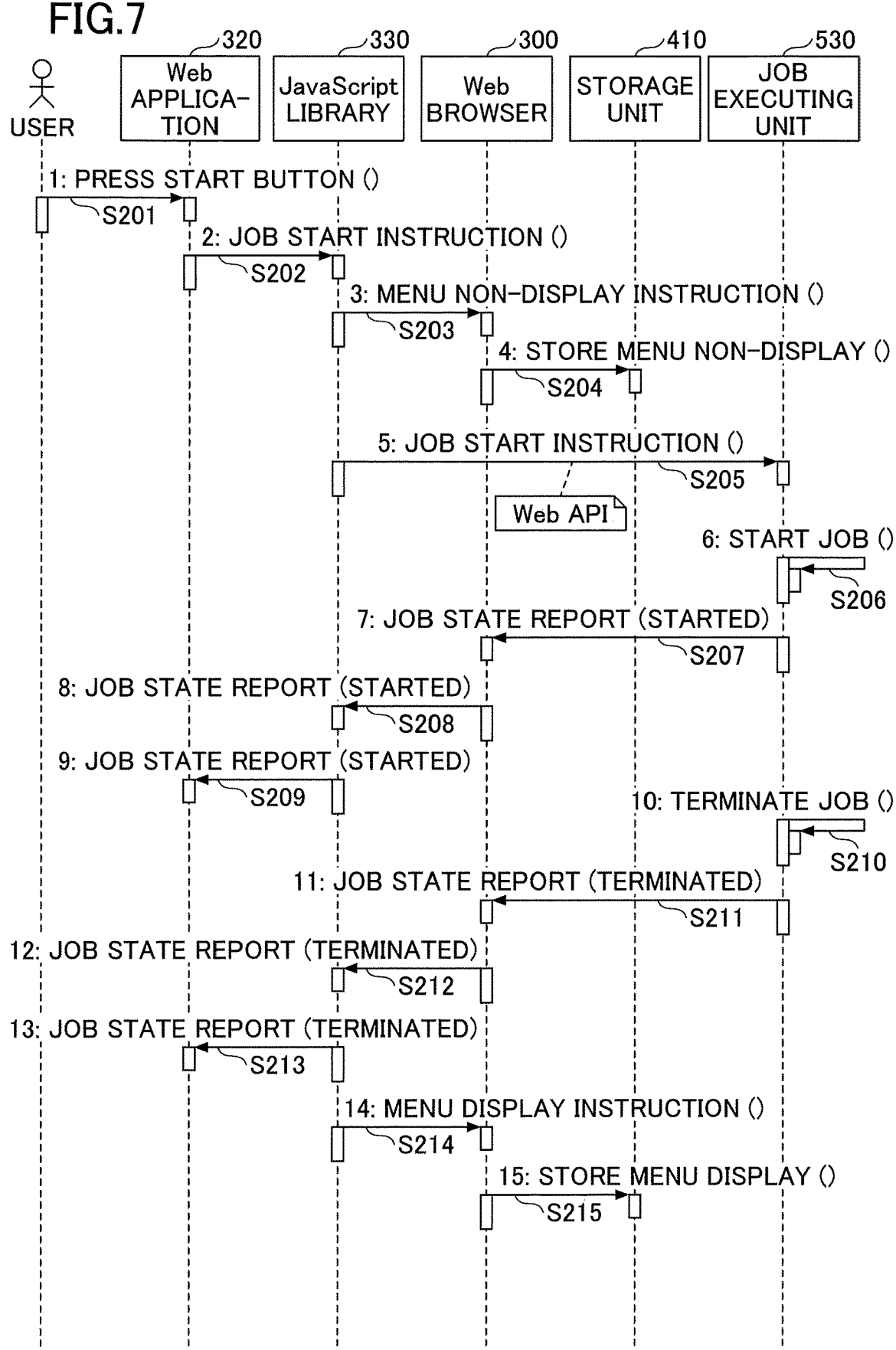
FIG. 7 is a sequence diagram illustrating a processing procedure of the information processing system according to the first embodiment of the present invention.

The sequence diagram of FIG. 5 is an example in which the web application 320 determines whether the menu is to be displayed or hidden. However, the JavaScript library 330 may determine whether the menu is to be displayed or hidden as illustrated in FIG. 7. FIG. 7 is a sequence diagram illustrating an example of a processing procedure of the information processing system according to the present embodiment. The sequence diagram illustrated in FIG. 7 is the same as the sequence diagram illustrated in FIG. 5 except for a part thereof, and, therefore, descriptions will be omitted accordingly.

In step S201, the user presses the start button 1002 of the web application screen 1000. The web application 320, which receives the report of the pressing of the start button 1002 from the UI unit 311 of the browser control unit 310, instructs the JavaScript library 330 to start a job in step S202. Specifically, this is an operation in which JavaScript described in the web content for implementing the web application 320 calls the API of the job start instruction of the JavaScript library 330.

When the job start instruction is accepted, the menu display/non-display instructing unit 332 of the JavaScript library 330 proceeds to step S203 to give a menu non-display instruction to the web browser 300. Proceeding to step S204, the web browser 300 stores the menu non-display information in the storage unit 410. While the menu non-display information is stored in the storage unit 410, the termination operation of the web application 320 is prevented as will be described later.

After the menu display/non-display instructing unit 332 gives the menu non-display instruction to the web browser 300, the process proceeds to step S205, and the job start instructing unit 331 of the JavaScript library 330 instructs the job executing unit 530 to start the job by using the Web API 510. Proceeding to step S206, the job executing unit 530 starts the execution of the job.

In step S207, the job execution state reporting unit 531 of the main body apparatus 12 reports, to the web browser 300, "started" as the job execution state. The job execution state "started" is reported to the web application 320 in steps S208 to S209.

In step S210, the job executing unit 530 terminates the execution of the job. In step S211, the job execution state reporting unit 531 of the main body apparatus 12 reports, to the web browser 300, "terminated" as the job execution state. The job execution state "terminated" is reported to the web application 320 in steps S212 to S213.

Proceeding to step S214, the menu display/non-display instructing unit 332 of the JavaScript library 330, which has received the report of the job execution state "terminated", gives a menu display instruction to the web browser 300.

Proceeding to step S215, the web browser 300 stores the menu display information in the storage unit 410. While the menu display information is stored in the storage unit 410, the termination operation of the web application 320 is not prevented, as will be described later. In accordance with the processing of the sequence diagram of FIG. 7, the JavaScript library 330 can determine the timing when to start/end the prevention of the termination operation of the web application 320. That is, the prevention of the termination operation of the web application 320 can be started/ended at a timing desired by the manufacturer vendor.

Figure 8:
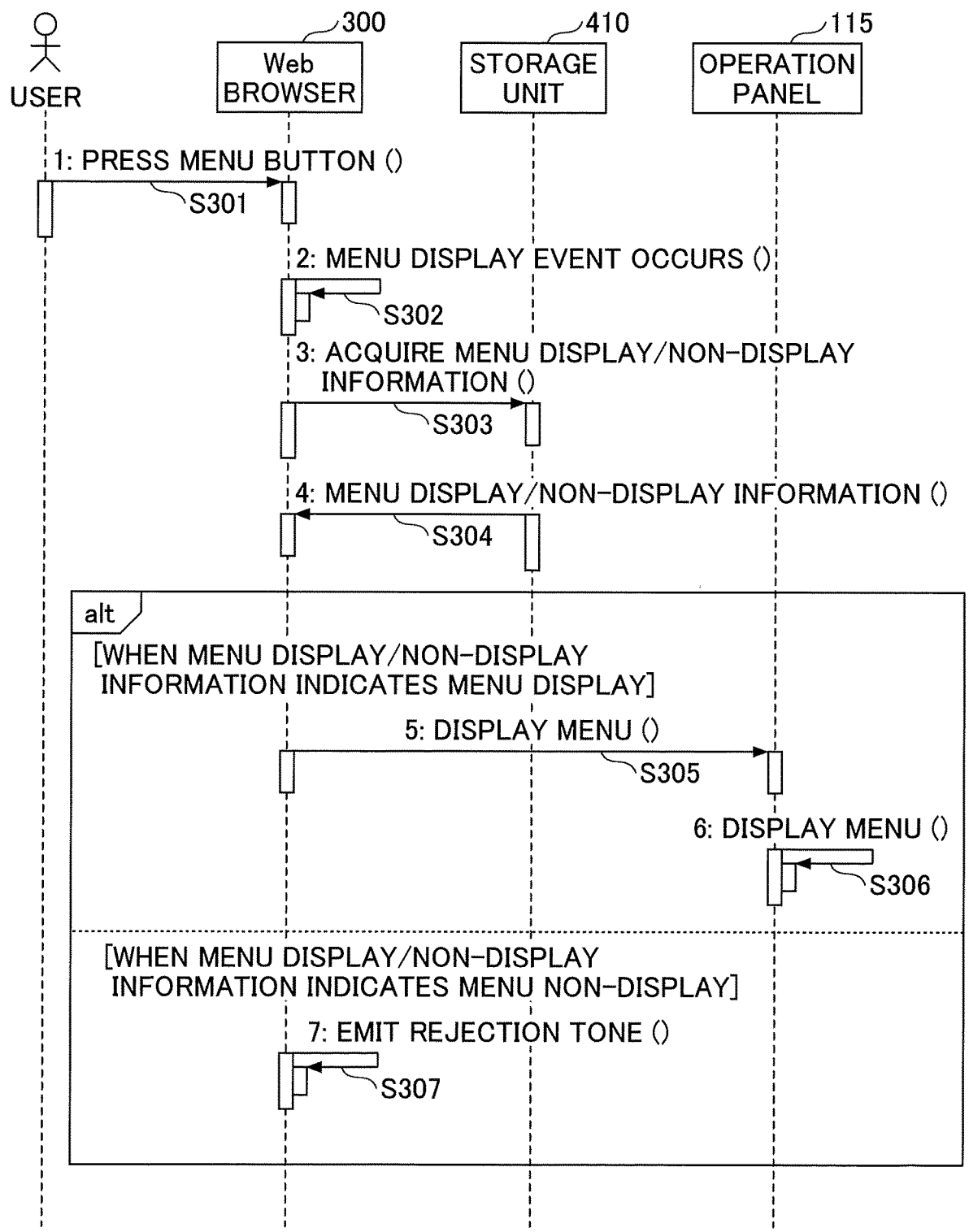
FIG. 8 is a sequence diagram illustrating a procedure of a menu display/non-display processing of the information processing system according to the first embodiment of the present invention.

FIG. 8 is a sequence diagram illustrating an example of a procedure of the menu display/non-display processing by the information processing system according to the present embodiment. In step S301, for example, the user presses a menu button 1003 of the web application screen 1000 of FIG. 6. When the menu button 1003 is pressed, a menu display event occurs in the web browser 300 in step S302.

For example, in the case of the web browser 300 operating on Android (registered trademark), which is an example of an OS, the OS detects the pressing of the menu button 1003 by the user and reports, to the web browser 300, a menu display event from the OS.

When a menu display event occurs, in steps S303 to S304, the web browser 300 confirms whether the menu display information is stored or whether menu non-display information is stored in the storage unit 410.

When the menu display information is stored in the storage unit 410, the termination operation of the web application 320 is not in an prevented state, and, therefore, the web browser 300 instructs the operation panel 115 to display the menu in step S305. In step S306, the operation panel 115 displays a menu 1004, such as that illustrated in FIG. 9, on the web application screen 1000.

When the menu non-display information is stored in the storage unit 410, the termination operation of the web application 320 is in an prevented state, and, therefore, the web browser 300 emits a rejection tone in step S307 and does not instruct the operation panel 115 to display the menu.

Note that although FIG. 8 illustrates an example of menu non-display as an example of processing for preventing a termination operation of the web application 320, the processing is sufficient as long as the user is prevented from performing the operation of terminating the web application 320. The processing of preventing the termination operation of the web application 320 includes preventing the user's operation for transitioning to another web page (input of a URL, usage of a bookmark, pressing of a proceed button or a return button, etc.), preventing the pressing of a reload button, and preventing the termination operation of the web browser 300.

As described above, in the sequence diagram of FIG. 8, while the menu non-display information is stored in the storage unit 410, even if an event in which the termination operation of the web application 320 is possible occurs, the processing of this event will not be performed.

Therefore, according to the information processing system 1 according to the present embodiment, it is possible to prevent the termination operation of the web application 320 until the job executed by the web application 320 is terminated. As described above, it is possible to prevent the termination operation (inadvertent operation by the user) of the web application 320 while the job is being executed, so that it is possible to solve the problem that the web application 320 is terminated while the job is being executed and the executed job cannot be continued.

In the present embodiment, an example in which the menu 1004 is not displayed even though the menu button 1003 is pressed has been described. However, the menu 1004 may be grayed out such that an operation from a user cannot be accepted. Alternatively, the menu button 1003 may be hidden or grayed out such that the pressing of the menu button 1003 by the user cannot be accepted.

In such a case, the JavaScript library 330 for hiding the menu button 1003 and the JavaScript library 330 for graying out the menu 1004 so that operations from a user cannot be accepted, are prepared. In this way, by preparing the JavaScript libraries 330, which perform different processes, the third-party vendors and the like who develop and provide web applications 320 can be separately used.

The sequence diagrams of FIGS. 5 and 7 are examples in which the started job is terminated normally without any errors occurring in the job. When an error occurs in the started job and the job is cancelled by the user, the non-display of the menu is cancelled as illustrated in FIGS. 10A and 10B.

Figure 10A:
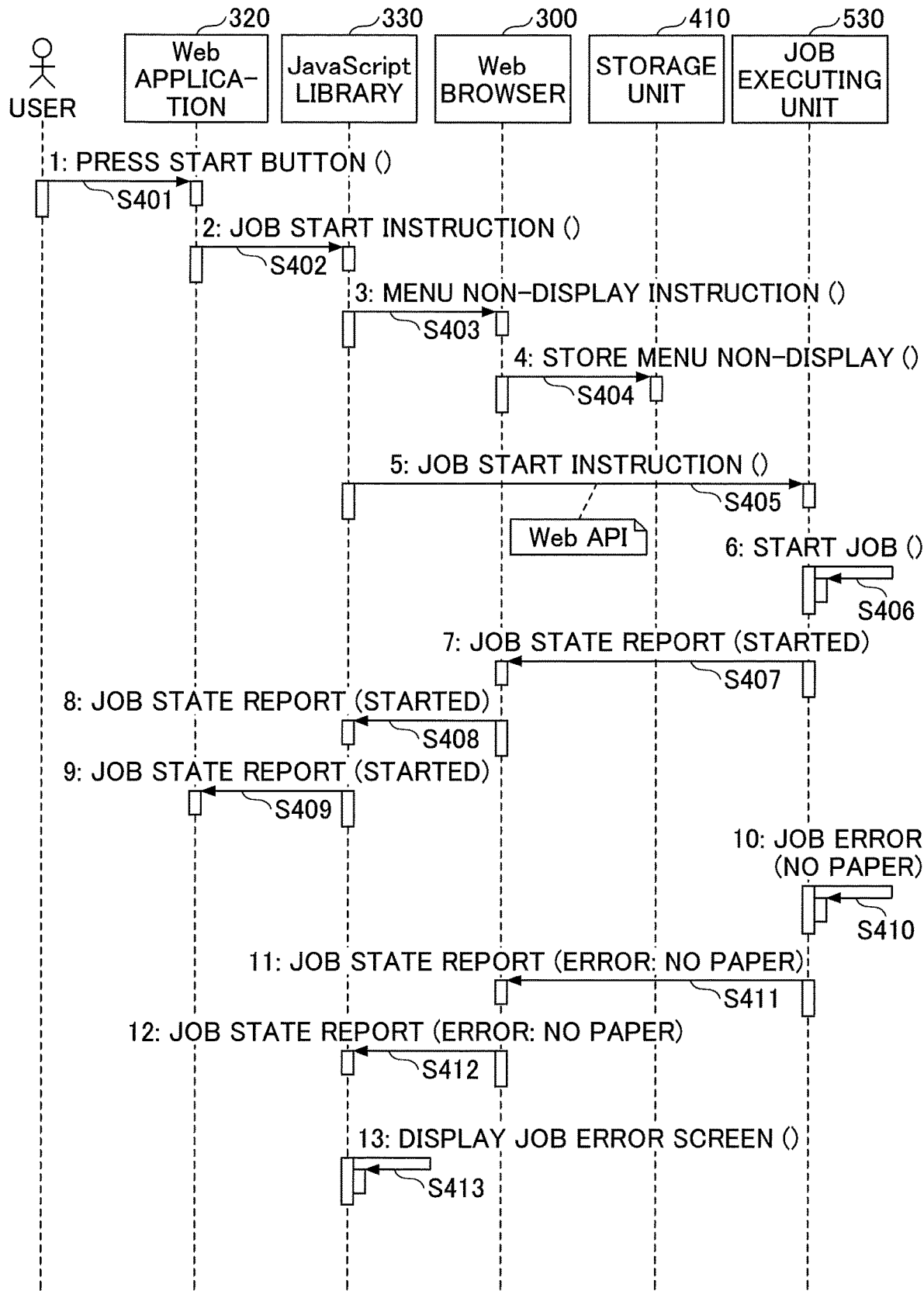
FIG. 10A is an example of a sequence diagram (1/2) illustrating a processing procedure of the information processing system according to the first embodiment of the present invention.

FIGS. 10A and 10B are sequence diagrams illustrating a processing procedure of the information processing system according to the present embodiment. The sequence diagrams of FIGS. 10A and 10B are the same as the sequence diagram of FIG. 7 except for a part thereof, and, therefore, descriptions will be omitted accordingly. Steps S401 to S409 are the same as steps S201 to S209 of FIG. 7.

In step S410, the job executing unit 530 detects that a no paper error has occurred in the currently executed job. In step S411, the job execution state reporting unit 531 of the main body apparatus 12 reports, to the web browser 300, "error: no paper" as the job execution state. The job execution state "error: no paper" is reported to the JavaScript library 330 in step S412. Proceeding to step S413, the JavaScript library 330 displays a job error screen 1005 on the web application screen 1000, as illustrated in FIG. 11.

When a cancel button 1006 is pressed during the display of the job error screen 1005, the processes in steps S414 to S422 are performed. When paper is replenished, the processes from step S423 and beyond are performed.

A user who wishes to cancel a job can select cancellation of the job by pressing the cancel button 1006 in step S414. The JavaScript library 330 that detects the pressing of the cancel button 1006 proceeds to step S415 and erases the job error screen 1005 of FIG. 11.

Proceeding to step S416, the JavaScript library 330 instructs the job execution unit 530 to cancel the job by using the Web API 510. Proceeding to step S417, the job executing unit 530 terminates the execution of the job. In step S418, the job execution state reporting unit 531 of the main body apparatus 12 reports, to the web browser 300, "terminated" as the job execution state. The job execution state "terminated" is reported to the web application 320 in steps S419 to S420.

Proceeding to step S421, the menu display/non-display instructing unit 332 of the JavaScript library 330, which has received the report of the job execution state "terminated", instructs the web browser 300 to display the menu.

Proceeding to step S422, the web browser 300 stores the menu display information in the storage unit 410. Therefore, when the user selects to cancel the job, the termination operation of the web application 320 is not prevented.

On the other hand, a user who wishes to continue the job may replenish the paper sheets to eliminate the cause of the no paper error. In step S423, the job executing unit 530 detects the replenishment of the paper sheets. The job executing unit 530 that detects the replenishment of the paper sheets proceeds to step S424 and automatically resumes the job execution.

In step S425, the job execution state reporting unit 531 of the main body apparatus 12 reports, to the web browser 300, "resumed" as the job execution state. The job execution state "resumed" is reported to the JavaScript library 330 in steps S425 to S426.

Proceeding to step S427, the JavaScript library 330, which has received the report of the job execution state "resumed", erases the job error screen 1005 of FIG. 11. The processes from step S428 and beyond are the same as those in steps S417 to S422, and, therefore, the descriptions will be omitted.

According to FIGS. 10A and 10B, by cancelling a job, it is possible to cancel the non-display of the menu, so that it is possible to prevent a situation of forgetting to cancel the non-display of the menu. FIGS. 10A and 10B have been described with respect to an example in which the JavaScript library 330 determines whether a menu is to be displayed or hidden; however, these processes may also be applied to an example in which the web application 320 determines whether a menu is to be displayed or hidden, as illustrated in FIG. 5.

Figure 12:
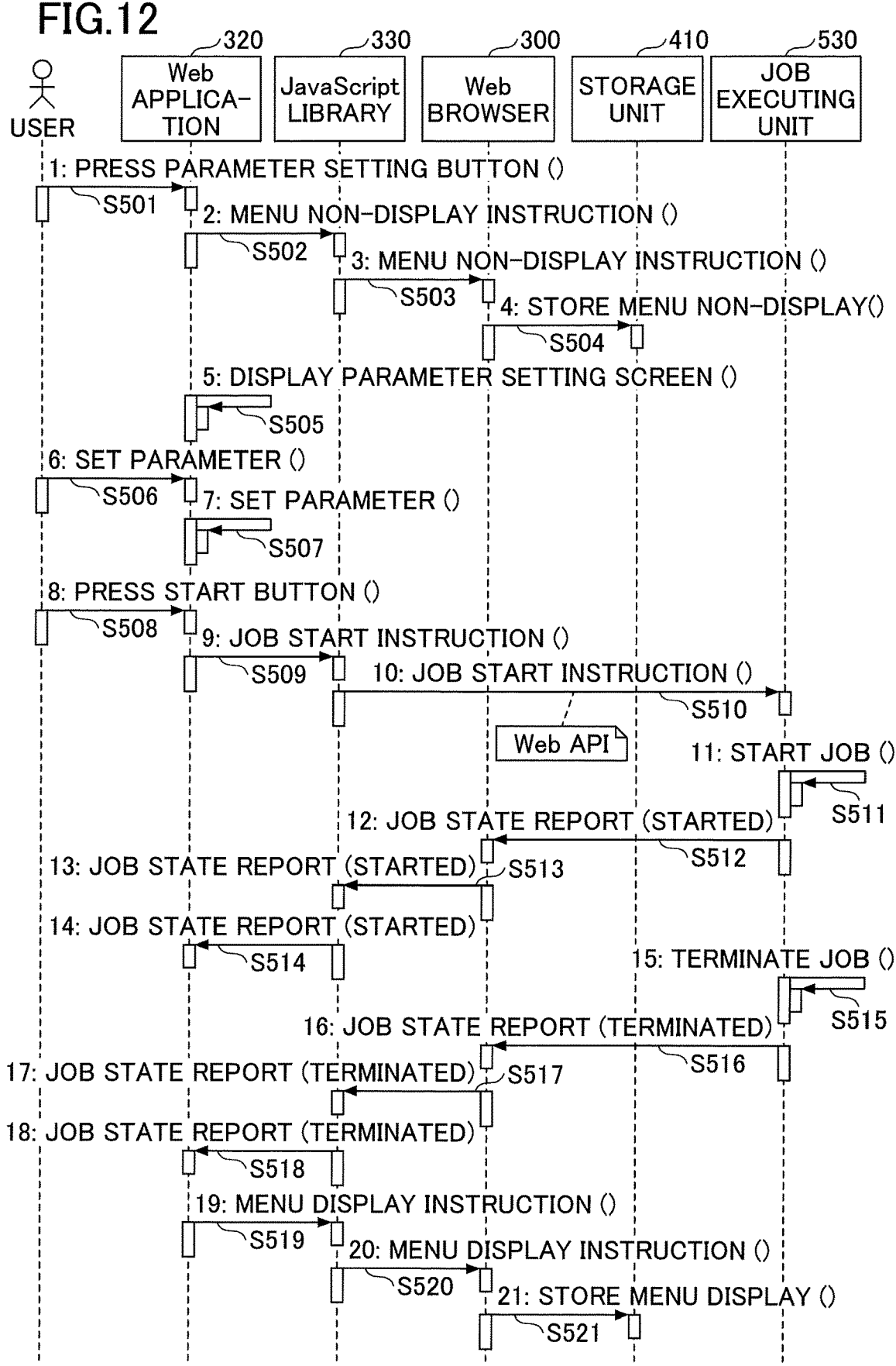
FIG. 12 is a sequence diagram illustrating a processing procedure of the information processing system according to the first embodiment of the present invention.

In the sequence diagrams of FIGS. 5, 7, 10A and 10B, the menu 1004 is not displayed after the start button 1002 is pressed. In FIG. 12, the menu 1004 is prevented from being displayed after pressing a parameter setting button 1007 for a job.

FIG. 12 is a sequence diagram illustrating a processing procedure of the information processing system according to the present embodiment. The sequence diagram of FIG. 12 includes the same processes as the sequence diagram of FIG. 5, and, therefore, the descriptions will be omitted accordingly.

In step S501, the user presses the parameter setting button 1007 in the web application screen 1000. The web application 320, which has received a report of the pressing of the parameter setting button 1007 from the UI unit 311 of the browser control unit 310, instructs the JavaScript library 330 to hide the menu display in step S502. The menu display/non-display instructing unit 332 of the JavaScript library 330 proceeds to step S503 and gives a menu non-display instruction to the web browser 300.

Figure 13:
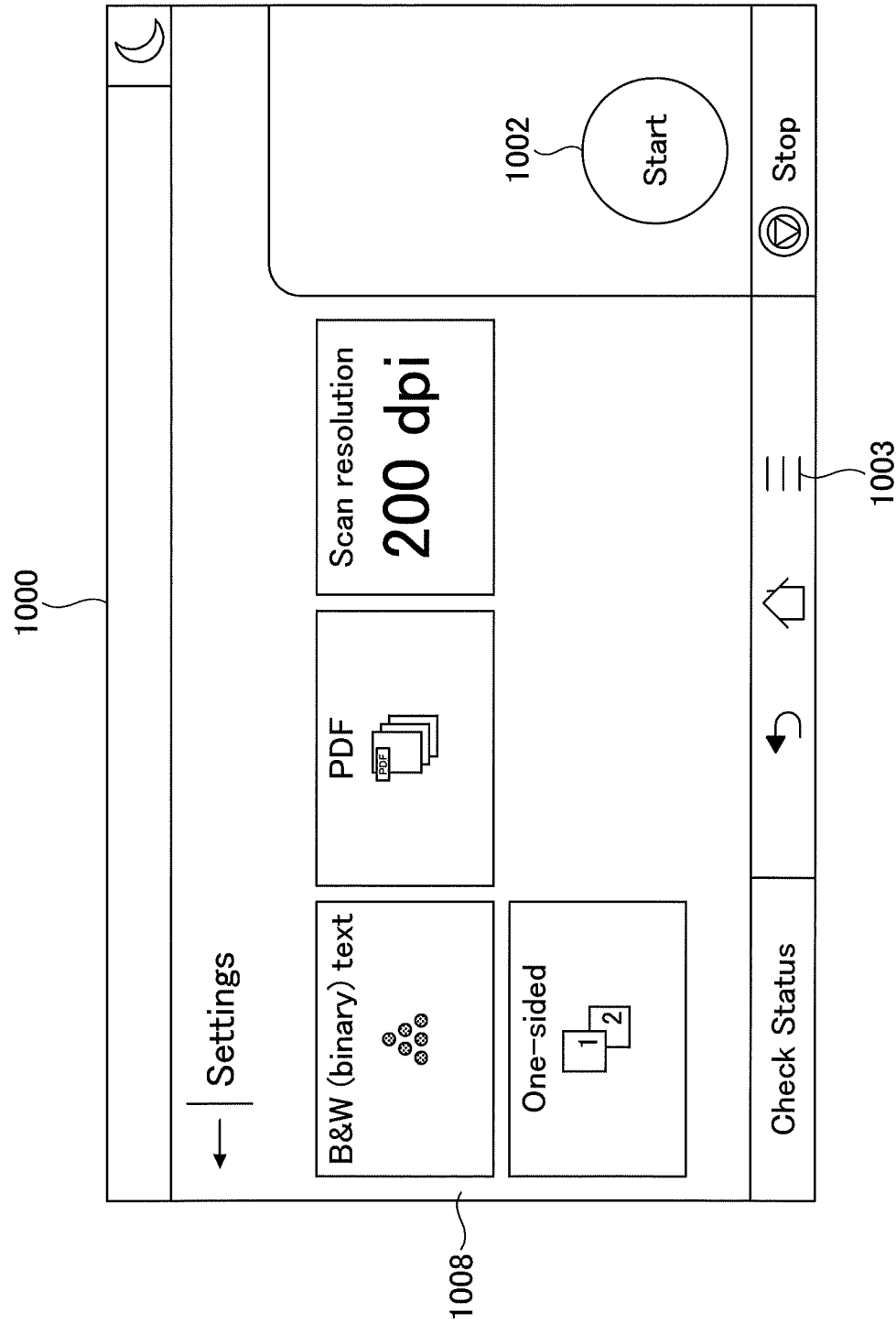
FIG. 13 is an image diagram illustrating an example of a web application screen in which a parameter setting screen of a job is displayed according to the first embodiment of the present invention.

Proceeding to step S504, the web browser 300 stores the menu non-display information in the storage unit 410. While the menu non-display information is stored in the storage unit 410, the termination operation of the web application 320 is prevented. Proceeding to step S505, the web application 320 displays a parameter setting screen 1008 of a job on the web application screen 1000 as illustrated in FIG. 13.

Figure 14:
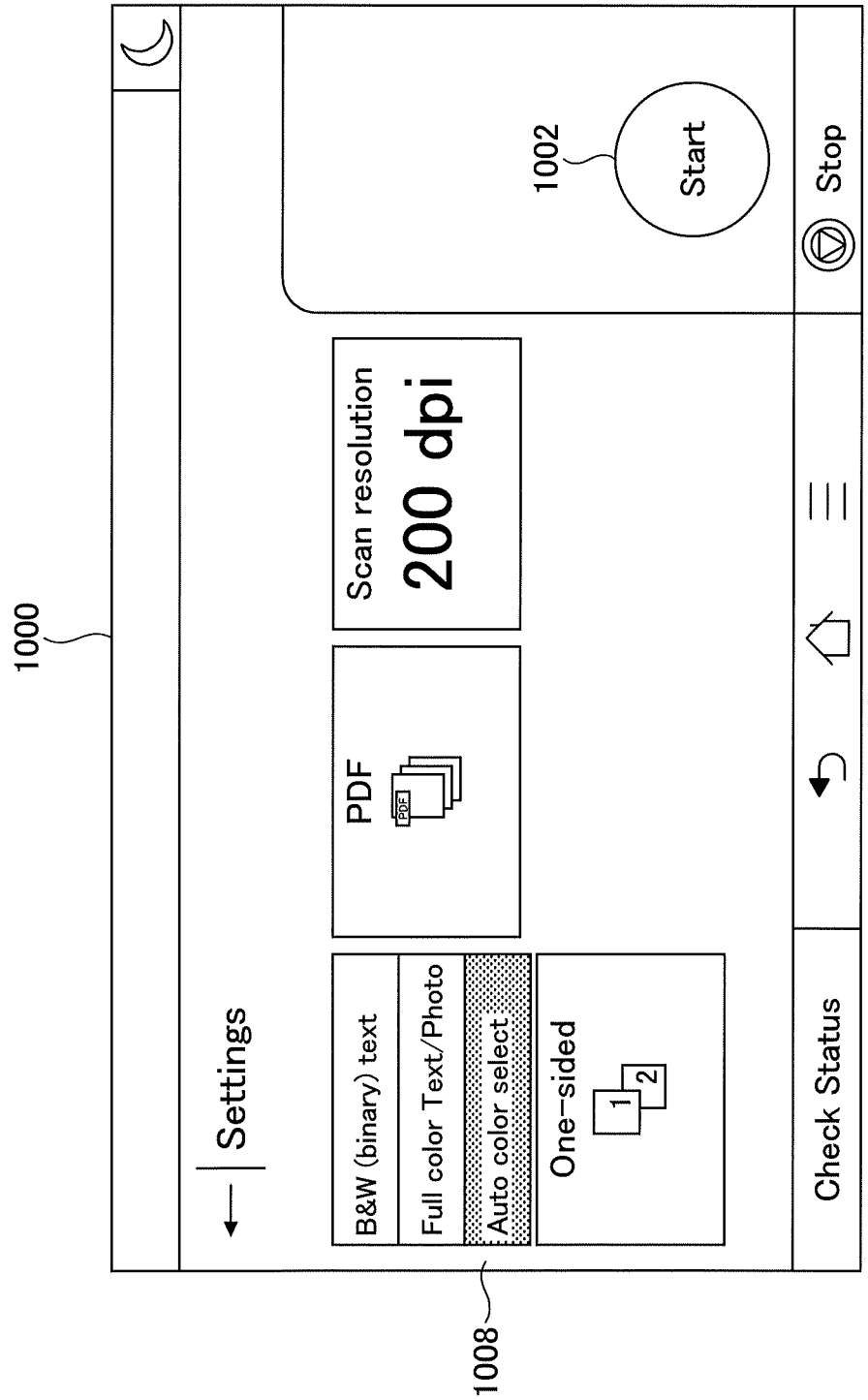
FIG. 14 is an image diagram illustrating an example of a parameter setting screen of a job in which parameters of a job are set according to the first embodiment of the present invention.
Figure 15:
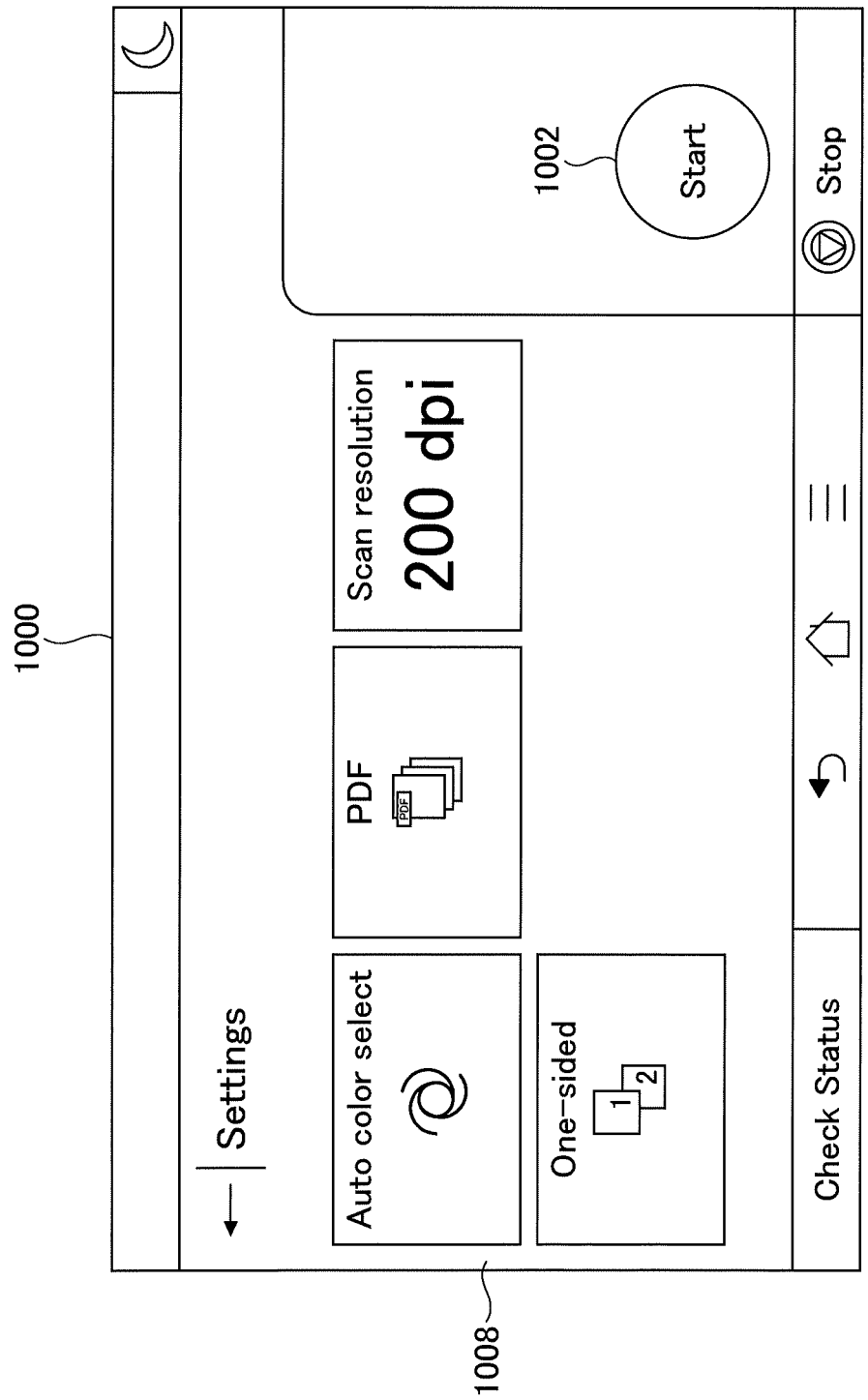
FIG. 15 is an image diagram illustrating an example of a parameter setting screen of a job in which parameters of a job are set according to the first embodiment of the present invention.

Proceeding to steps S506 to S507, the user performs parameter setting for the job in the parameter setting screen 1008 of the job as illustrated in FIGS. 14 and 15. When the user finishes setting the parameters of the job, the user presses the start button 1002 in step S508.

Proceeding to step S509, the web application 320 instructs the JavaScript library 330 to start the job. The menu non-display instruction has been given to the JavaScript library 330 in step S502, and, therefore, at the timing when the start button 1002 is pressed, the menu non-display instruction is not given to the JavaScript library 330.

The processes of steps S509 to S521 are the same as steps S105 to S117 in FIG. 1, and, therefore, descriptions will be omitted. FIG. 12 illustrates an example in which the web application 320 determines whether a menu is to be displayed or hidden; however, these processes may also be applied to an example in which the JavaScript library 330 determines whether a menu is to be displayed or hidden, as illustrated in FIG. 7.

Second Embodiment

In the first embodiment, the web application 320 or the JavaScript library 330 determines whether a menu is to be displayed or hidden. A second embodiment is an example in which the web browser 300 determines whether a menu is to be displayed or hidden.

Figure 16:
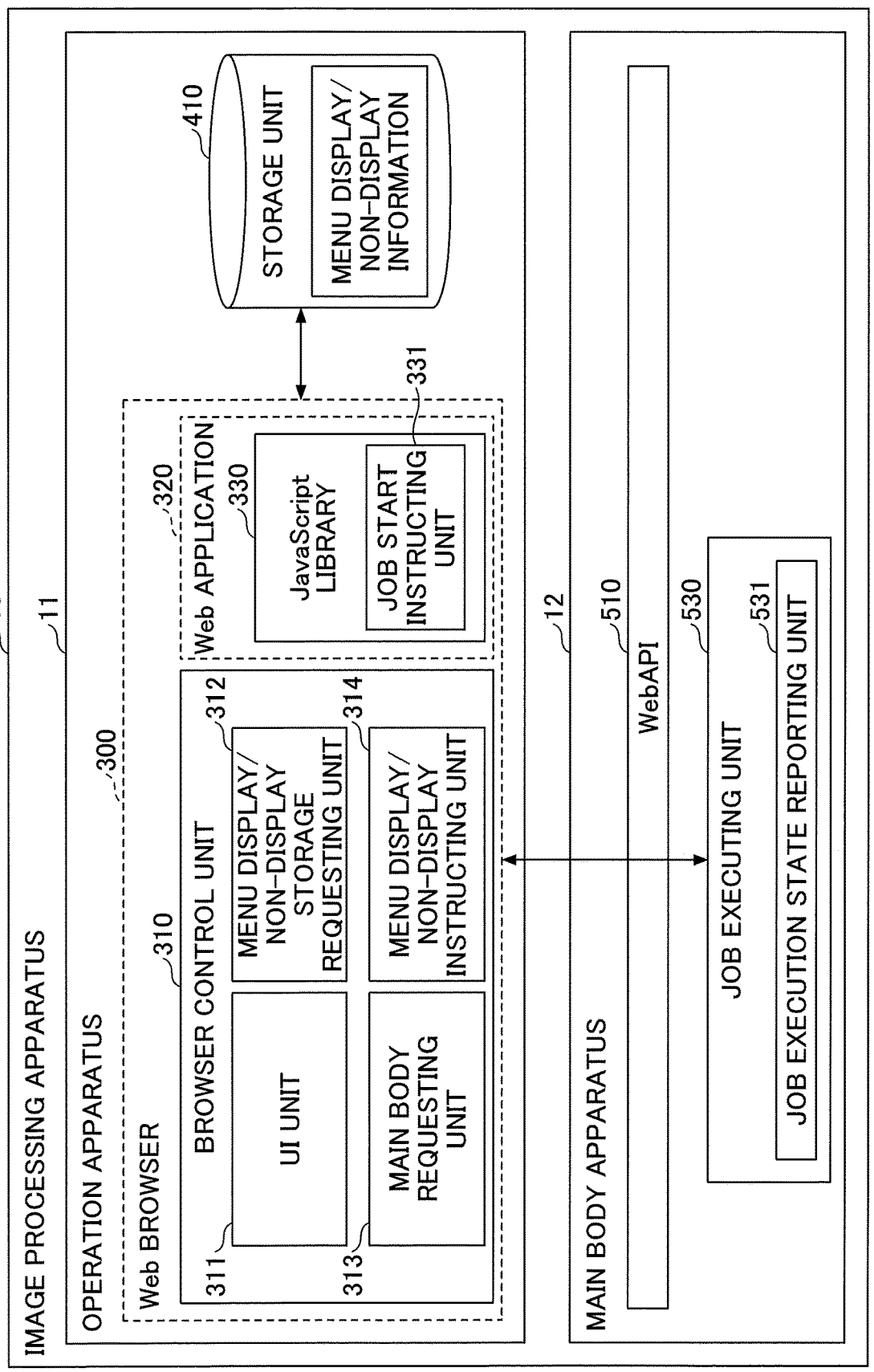
FIG. 16 is a software configuration diagram illustrating another example of an image processing apparatus according to a second embodiment of the present invention.

FIG. 16 is a software configuration diagram of another example of the image processing apparatus according to the present embodiment. In the image processing apparatus 10 of FIG. 16, instead of the menu display/non-display instructing unit 332 of FIG. 4, a menu display/non-display instructing unit 314 of the browser control unit 310 is provided. The menu display/non-display instructing unit 314 of the browser control unit 310 instructs the menu display/non-display storage requesting unit 312 to store the display/non-menu display information in the storage unit 410.

Figure 17:
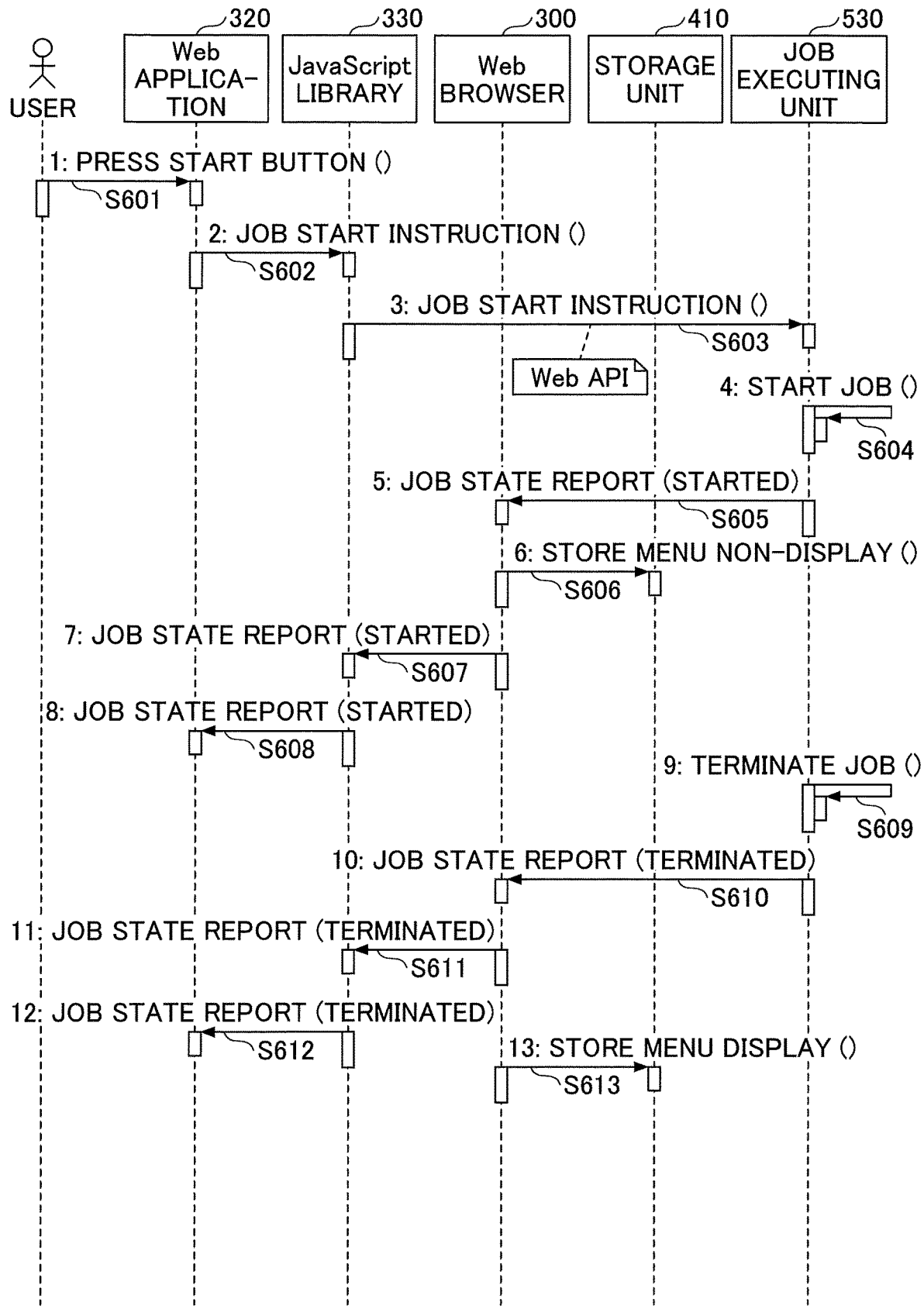
FIG. 17 is a sequence diagram of another example illustrating a processing procedure of the information processing system according to the second embodiment of the present invention.

FIG. 17 is a sequence diagram of another example illustrating a processing procedure of the information processing system according to the present embodiment. In step S601, the user presses the start button 1002 of the web application screen 1000. The web application 320, which has received a report of the pressing of the start button 1002 from the UI unit 311 of the browser control unit 310, instructs the JavaScript library 330 to hide the menu in step S602.

In step S603, the job start instructing unit 331 of the JavaScript library 330 instructs the job executing unit 530 to start the job by using the Web API 510. Proceeding to step S604, the job executing unit 530 starts the execution of the job.

In step S605, the job execution state reporting unit 531 of the main body apparatus 12 reports, to the web browser 300, "started" as the job execution state. Proceeding to step S606, the web browser 300 stores the menu non-display information in the storage unit 410. While the menu non-display information is stored in the storage unit 410, the termination operation of the web application 320 is prevented. The job execution state "started" is reported to the web application 320 in steps S607 to S608.

In step S609, the job executing unit 530 terminates the execution of the job. In step S610, the job execution state reporting unit 531 of the main body apparatus 12 reports, to the web browser 300, "terminated" as the job execution state. The job execution state "terminated" is reported to the web application 320 in steps S611 to S612.

In step S613, the web browser 300, which has received the report of the job execution state "terminated", stores the menu display information in the storage unit 410. The image processing apparatus 10 in which the menu display information is stored in the storage unit 410, does not prevent the termination operation of the web application 320.

Third Embodiment

Figure 18:
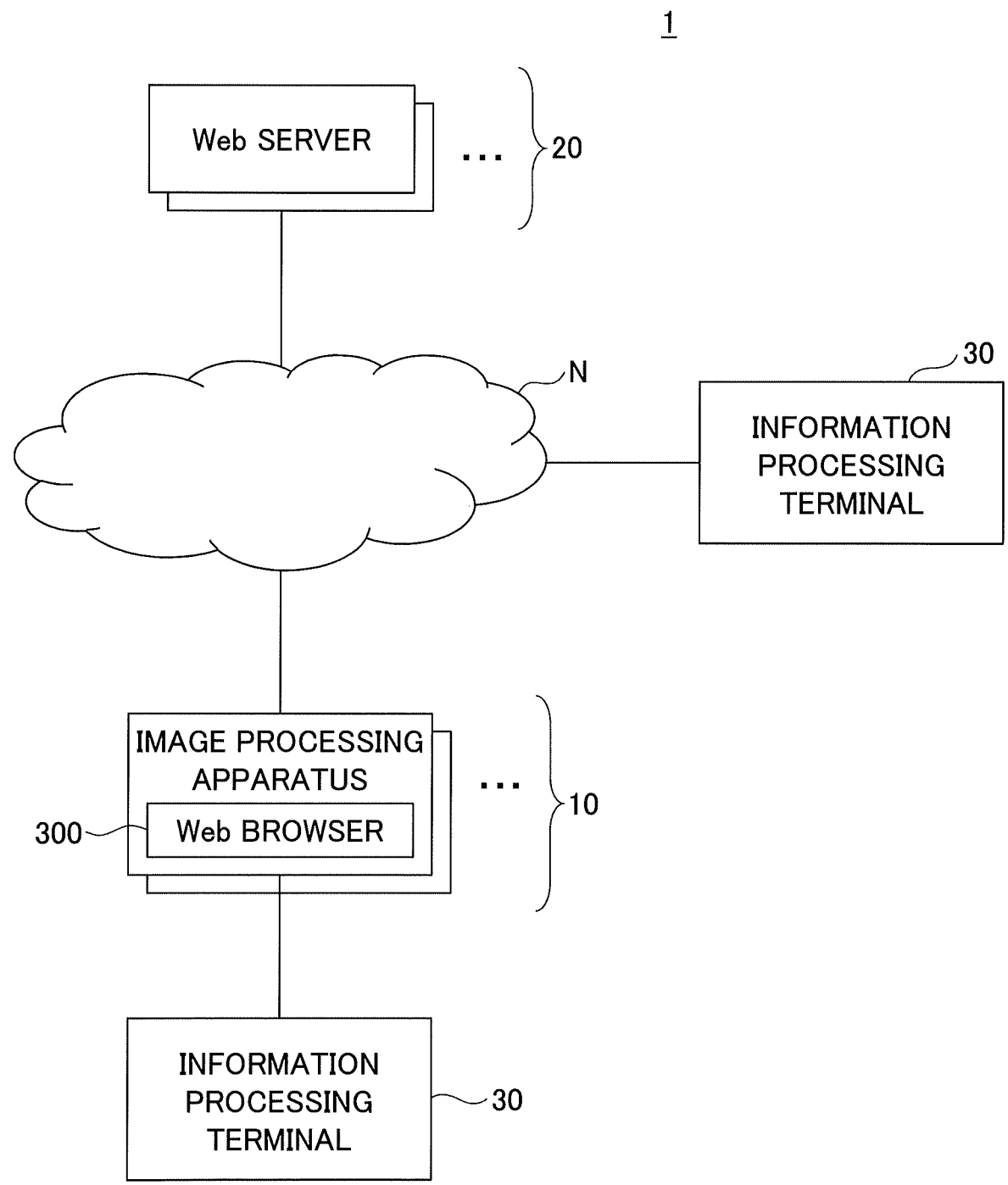
FIG. 18 is a diagram illustrating a configuration of another example of the information processing system according to a third embodiment of the present invention.

In the first and second embodiments, the user operates the operation apparatus 11 of the image processing apparatus 10. A third embodiment is an example in which the user operates the image processing apparatus 10 via an information processing terminal 30 such as a smartphone. FIG. 18 is a configuration diagram illustrating an example of the information processing system according to the present embodiment.

The information processing terminal 30 is a device having a web browser, such as a personal computer, a mobile phone, a smartphone, a tablet terminal, a game machine, a Personal Digital Assistant (PDA), a digital camera, a wearable terminal, or the like. The information processing terminal 30 is capable of data communication with the image processing apparatus 10 through short range wireless communication such as the network N or Bluetooth.

The information processing terminal 30 has the same configuration as the operation apparatus 11 of FIG. 4, and, therefore, the information processing terminal 30 can perform processing instead of the operation apparatus 11 according to the first and second embodiments. In the third embodiment, the functional blocks, other than the job executing unit 530, in the sequence diagrams of FIGS. 5, 7, 8, 10A, 10B, 12, and 17, are provided in the information processing terminal 30.

The present invention is not limited to the above specifically disclosed embodiments, and various modifications and variations are possible without departing from the scope of the claims. Each of the functions of the embodiments described above can be implemented by one or more processing circuits. Herein, a "processing circuit" includes a processor programmed to execute each function by software such as a processor implemented by an electronic circuit, an Application Specific Integrated Circuit (ASIC) designed to execute each function as described above, a Digital Signal Processor (DSP), a field programmable gate array (FPGA), or a device of a circuit module of the related art.

The job start instructing unit 331 is an example of a job start instructor. The job execution state reporting unit 531 is an example of a job execution state reporter. The menu display/non-display instructing unit 332 is an example of a termination operation preventer.

According to one embodiment of the present invention, it is possible to prevent the operation of terminating a web application until a job executed by the web application is terminated.

The electronic device, the information processing system, and the termination operation preventing method are not limited to the specific embodiments described in the detailed description, and variations and modifications may be made without departing from the spirit and scope of the present invention.

What is claimed is:

1. An electronic device comprising
    a processor, and
    a memory storing computer-executable instructions that cause the processor to:
        instruct, by a web application operating in a web browser, a job executor to start executing a job by using a library;
        send a report of an execution state of the job executed by the job executor; and
        store menu non-display information in a storage provided in the electronic device, so as to prevent a termination operation of terminating the web application that is displayed in the web browser, until the job instructed to start is terminated, said processor storing the menu-non-display information after a start button is pressed by a user of the electronic device, and also after a parameter setting button is pressed before the start button is pressed,
    wherein the processor prevents the termination operation of terminating the web application while the menu non-display information is stored in the storage.

2. The electronic device according to claim 1, wherein the processor prevents the termination operation of terminating the web application that is displayed in the web browser, according to an instruction to prevent the termination operation given by the library, the library being instructed to prevent the termination operation by the web application.

3. The electronic device according to claim 1, wherein the processor prevents the termination operation of terminating the web application that is displayed in the web browser, according to an instruction to prevent the termination operation given by the library, the library being instructed to start the job by the web application.

4. The electronic device according to claim 1, wherein the processor prevents the termination operation of terminating the web application that is displayed in the web browser, according to an instruction to prevent the termination operation given by the web browser, the web browser being notified that the job has started by receiving the report.

5. The electronic device according to claim 1, wherein the processor processing circuitry prevents the termination operation of terminating the web application, by not displaying a menu of the web application.

6. The electronic device according to claim 1, wherein the processor prevents the termination operation of terminating the web application, by displaying a menu of the web application in a state such that an operation by a user cannot be accepted.

7. The electronic device according to claim 1, wherein the processor prevents the termination operation of terminating the web application, by not displaying a button for accepting, from a user, an operation of displaying a menu of the web application.

8. The electronic device according to claim 1, wherein the processor prevents the termination operation of terminating the web application, from when an operation to display a parameter setting screen of the web application is accepted from a user, to when the job instructed to start is terminated.

9. The electronic device according, to claim 1, wherein the processor cancels the preventing of the termination operation of terminating the web application, upon detecting that cancellation of the job instructed to start is selected.

10. The electronic device according to claim 1, wherein the processor stops a prevention of the termination operation of terminating the web application by storing menu display information in the storage.

11. An information processing system comprising:
    a processor; and
    a memory storing computer-executable instructions that cause the processor to:
        instruct, by a web application operating in a web browser included in an information processing terminal, a job executor included in an electronic device to start executing a job by using a library;
        send a report of an execution state of the job executed by the job executor; and
        prevent a termination operation, of terminating the web application that is displayed in the web browser, until the job instructed to start is terminated by storing menu non-display information in a storage provided in the electronic device after a start button is pressed by a user of the electronic device, and also after a parameter setting button is pressed before the start button is pressed,
    wherein the processor prevents the termination operation of terminating the web application while the menu non-display information is stored in the storage.

12. A method for preventing a termination operation, the method comprising:
    instructing, by a web application operating in a web browser, a job executor included in an electronic device to start executing a job by using a library;
    sending a report of an execution state of the job executed by the job executor; and
    preventing the termination operation of terminating the web application that is displayed in the web browser, until the job instructed to start is terminated by storing menu non-display information in a storage provided in the electronic device after a start button is pressed by a user of the electronic device, and also after a parameter setting button is pressed before the start button is pressed,
    wherein the preventing prevents the termination operation, of terminating the web application while the menu non-display information is stored in the storage.

* * * * *